United States Patent [19]
Yamaguchi

[11] Patent Number: 5,826,816
[45] Date of Patent: Oct. 27, 1998

[54] APPARATUS FOR ATTACHING FILM ON TO A SPOOL IN A CARTRIDGE AND WINDING THE FILM ON THE SPOOL

[75] Inventor: Takuji Yamaguchi, Wakayama, Japan

[73] Assignee: Noritsu Koki Co., Ltd., Wakayama-ken, Japan

[21] Appl. No.: 735,720

[22] Filed: Oct. 23, 1996

[30] Foreign Application Priority Data

| Oct. 25, 1995 | [JP] | Japan | 7-278035 |
| Oct. 25, 1995 | [JP] | Japan | 7-278036 |
| Oct. 25, 1995 | [JP] | Japan | 7-278037 |
| Oct. 25, 1995 | [JP] | Japan | 7-278038 |
| Oct. 25, 1995 | [JP] | Japan | 7-278039 |

[51] Int. Cl.$^6$ .................................................. B65H 19/28
[52] U.S. Cl. .................................. 242/532.6; 242/533.7; 242/534
[58] Field of Search .................... 242/532.6, 532.1, 242/533.7, 534, 332.2, 332.8, 348.1

[56] References Cited

U.S. PATENT DOCUMENTS

| 3,586,258 | 6/1971 | Horlezeder | 242/532.6 X |
| 3,930,296 | 1/1976 | Hoover | 242/532.6 X |
| 4,674,702 | 6/1987 | Lenoble et al. | 242/332.8 X |
| 4,957,247 | 9/1990 | Nakamura et al. | 242/532.6 X |
| 4,993,654 | 2/1991 | Suzuki et al. | 242/533.7 X |
| 5,165,619 | 11/1992 | Tanaka et al. | 242/532.1 X |
| 5,229,802 | 7/1993 | Shiota et al. . | |
| 5,520,348 | 5/1996 | Merle et al. | 242/348.1 |
| 5,544,835 | 8/1996 | Takahashi et al. | 242/348.1 |
| 5,566,897 | 10/1996 | Yago et al. | 242/348.1 |

FOREIGN PATENT DOCUMENTS

| 677785 | 10/1985 | European Pat. Off. . | |
| 660163 | 6/1995 | European Pat. Off. . | |
| 2182657 | 7/1990 | Japan | 242/534 |

*Primary Examiner*—Donald P. Walsh
*Assistant Examiner*—William A. Rivera
*Attorney, Agent, or Firm*—Jordan and Hamburg

[57] ABSTRACT

A film winding apparatus for winding a film into a cartridge includes a film winding mechanism provided in an apparatus housing for turning a spool housed in the cartridge to wind the film around the spool. The film is inserted through a film inlet located on one side of the apparatus housing and fed toward the film winder. The cartridge loaded on a cartridge mount provided on another side of the apparatus housing is conveyed up to the film winding mechanism, where the cartridge is set in a film loading position. The film winding apparatus thus constructed offers easy operation without any special adjustment or treatment of the film or cartridge, yet featuring single-unit construction and portability.

40 Claims, 13 Drawing Sheets

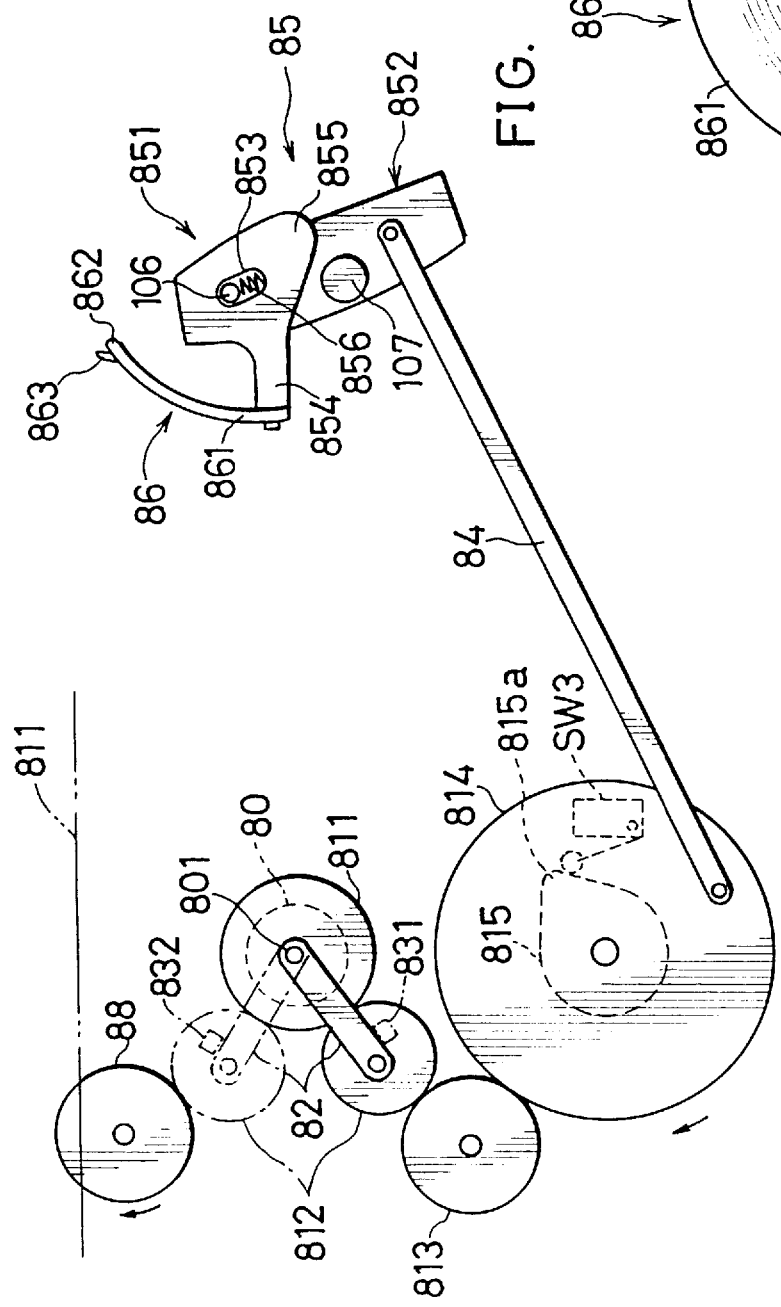
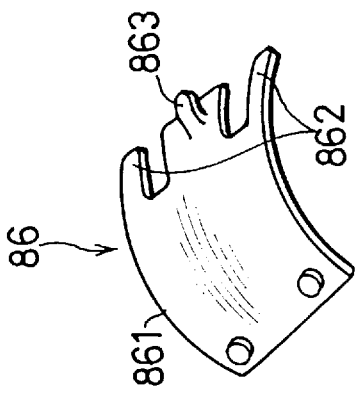
FIG. 9A
FIG. 9B

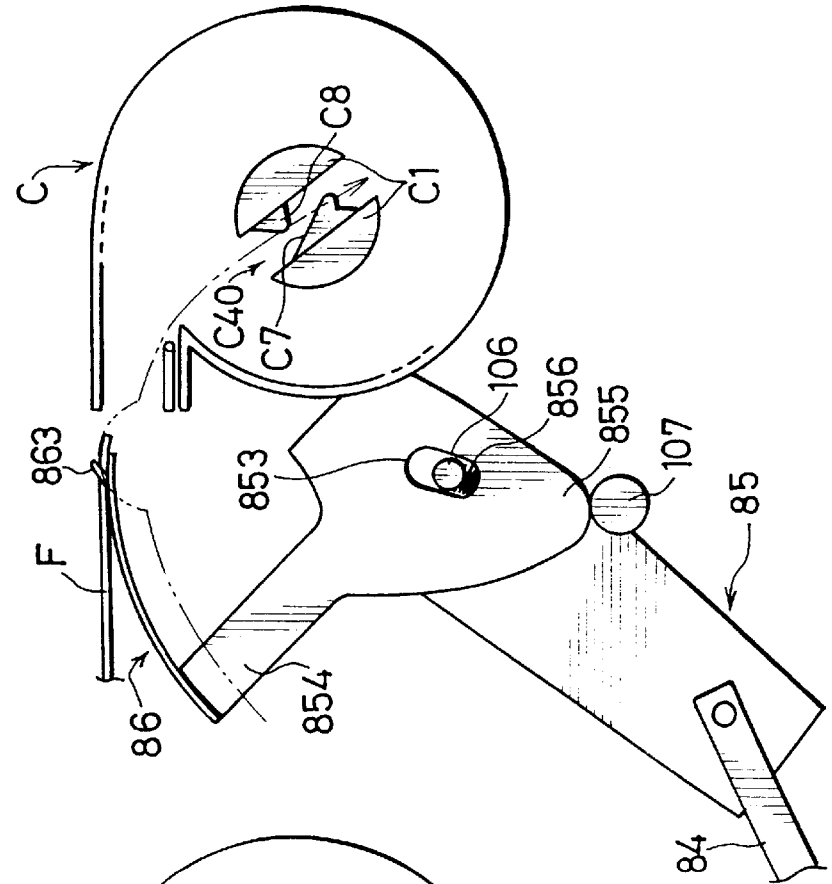
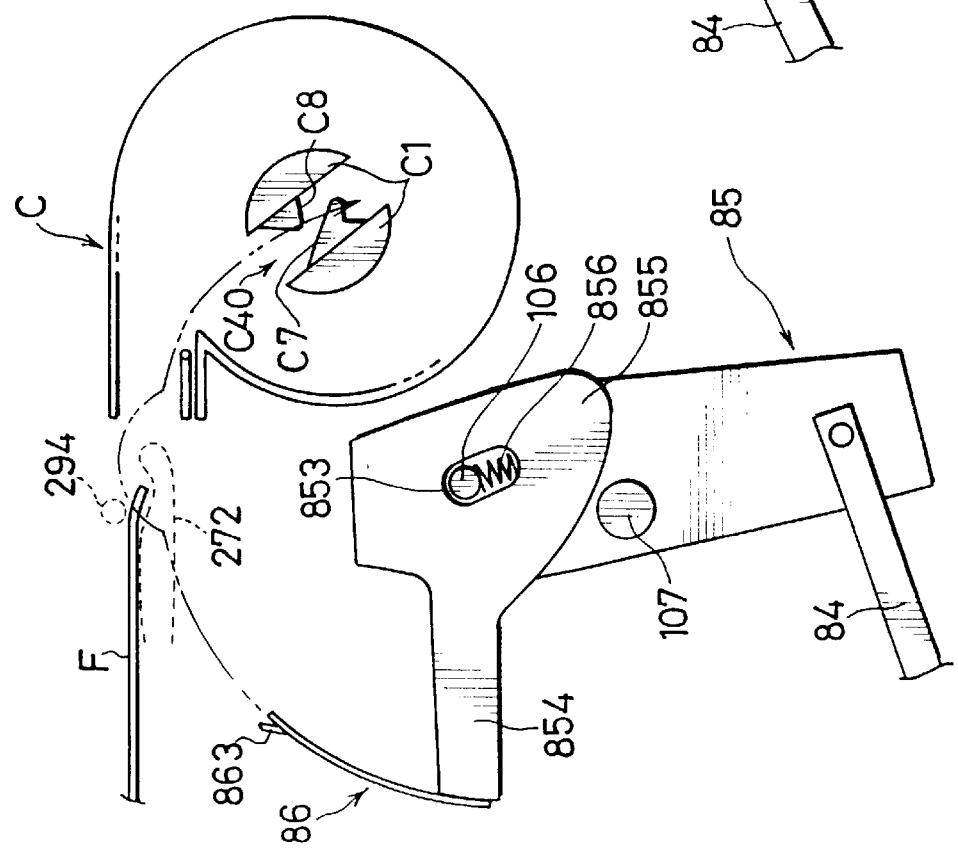
FIG. 10A
FIG. 10B

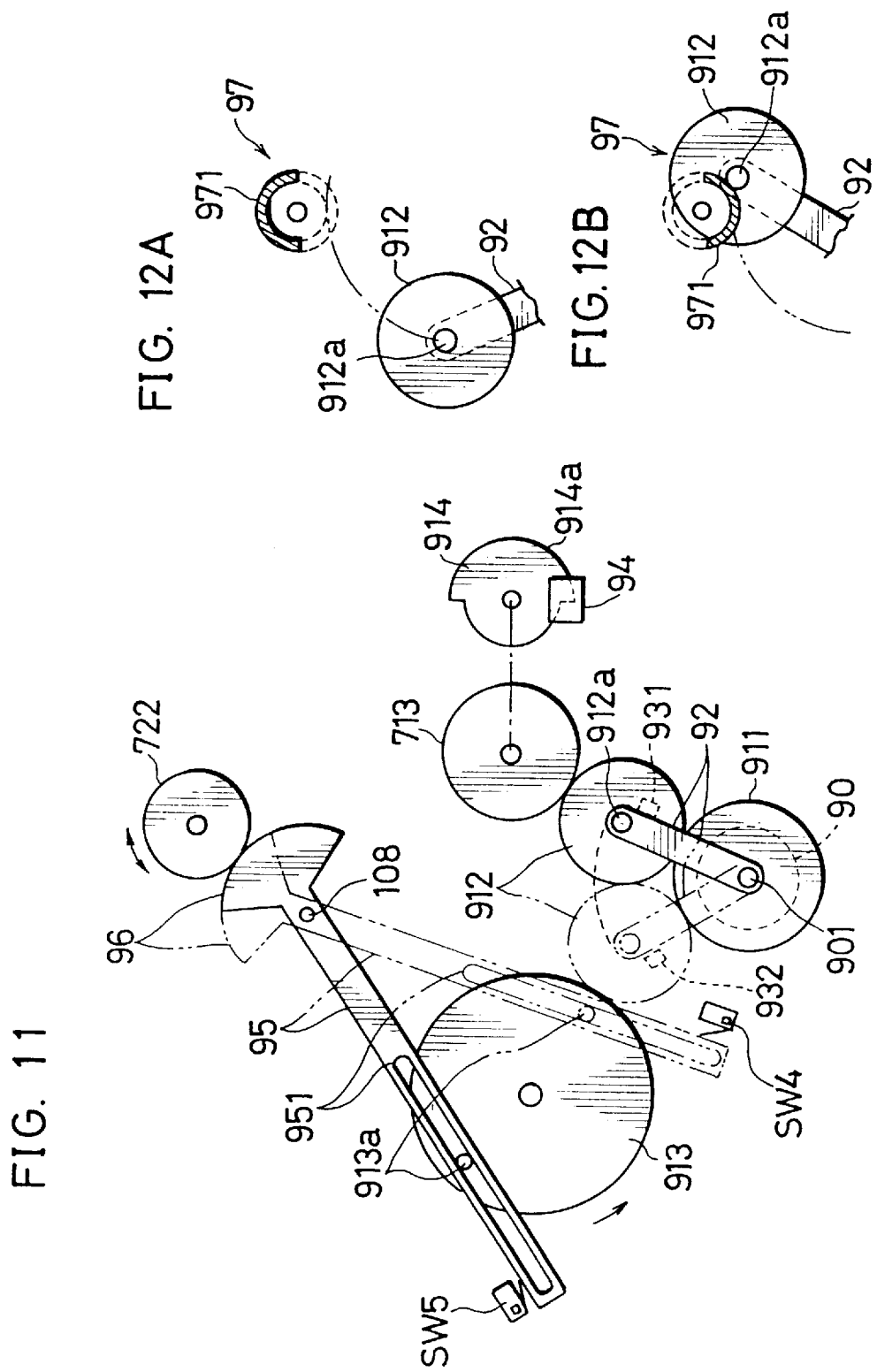

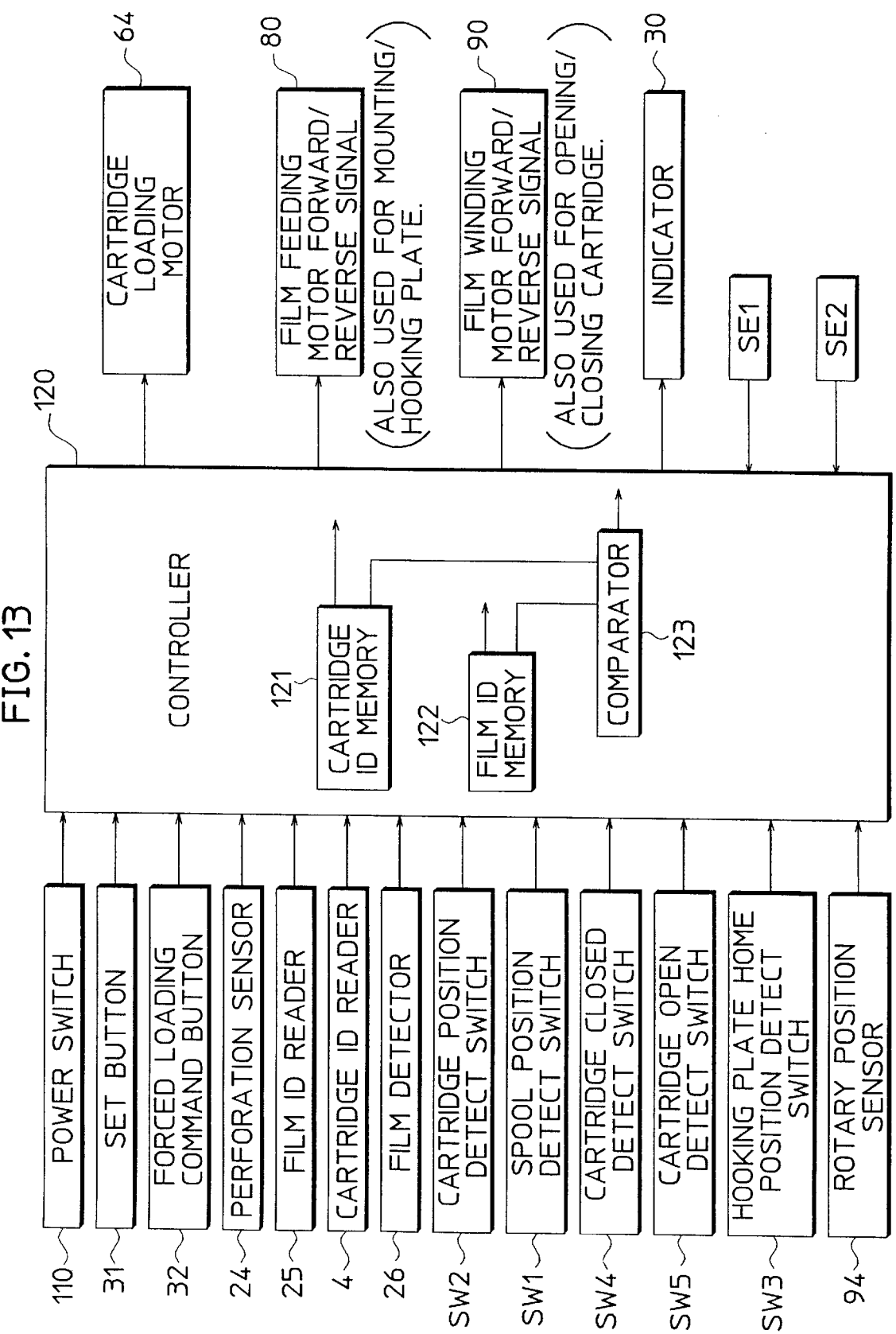

APPARATUS FOR ATTACHING FILM ON TO A SPOOL IN A CARTRIDGE AND WINDING THE FILM ON THE SPOOL

BACKGROUND OF THE INVENTION

The present invention relates to film winding apparatus for winding an already developed film into a film cartridge.

The prior art to which the invention is directed provides a well-known construction of a camera, in which a cartridge containing a roll of elongate film is loaded into the camera and photographed images are recorded on successive frames of the film as it is taken up by the length of a single frame at a time out of the cartridge. In this type of camera, the film is rewound back into the cartridge after photographing and the cartridge is removed from the camera. Upon receiving the cartridge from a customer, a film processing shop removes the exposed film out of the cartridge, affix a special attachment to the foremost portion (or tongue) of the film, and develops the film by guiding it through a series of tanks containing a developer solution, rinsing liquid, fixer and so forth required for film processing. The empty cartridge has conventionally been discarded. When the film has been developed and photographs has been printed, the developed film is usually cut into strips of six frames each, for instance, inserted into a dedicated film holder, and returned to the customer together with the printed photographs. It would be recognized that discarding empty cartridges and using such dedicated film holders incur additional costs in film production and processing. Furthermore, the process of inserting individual film strips into film holders is time-consuming and burdensome, resulting in limited labor productivity.

Taking into account the aforementioned problems in combination with the introduction of smaller-sized film cartridges in recent years, Japanese Unexamined Patent Publication No. 4-122925 proposes a film winding apparatus, in which each developed film is wound back into an original cartridge and then returned to customers. The apparatus disclosed in this Publication comprises a cartridge loading section, a film feeding section and a spool driving section which are constructed as separate units. Thus, the apparatus lacks portability due to this multi-unit construction. In an apparatus used for rewinding a film to be returned to a customer into an original cartridge, it is not possible to affix a leader attachment to the foremost end of the film, and it is remarkably difficult to properly align the foremost end of the film with a slitlike opening of the cartridge through which the film is pulled out and rewound. Utmost attention should therefore be paid to the design of a film inserting portion of the apparatus. Both the film and the cartridge should be placed at a film winding portion of the apparatus. A major consideration in this kind of apparatus is therefore how to set up the film and cartridge in its film winding portion if single-unit construction of the apparatus is essential. Another consideration to be given is how to check relationships between individual films and cartridges. This is because it is preferable that each film be rewound into its original cartridge.

The aforementioned Publication proposes further a dedicated device for inserting the foremost end of a film into a slot in a spool. According to the Publication, this dedicated device comprises a pair of elastic sheets, such as polyethylene terephthalate (PET) films, and a cutout is made at the forward end of the device. One end of the film sandwiched between the elastic sheets of the device is inserted into the opening of the cartridge and guided into a slot in the spool, where the end of the film is hooked to the spool. Although this elastic sheet device is advantageous in that it can hook the film to the spool, it is not easy to automate the processes of fitting the end of the film between the elastic sheets of the device and guiding the device through opening of the cartridge and into the slot in the spool.

As an alternative to the above-described arrangement of the Publication, it might be possible to directly hook up an end of the film and guide it into the cartridge. It is however remarkably difficult to construct such a hooking device that can not only hook up the film but also insert it into the opening of the cartridge.

In the film winding apparatus of the aforementioned Publication, the cartridge loading section, the film feeding section and the spool driving section are constructed as separate units and each cartridge is manually set into the cartridge loading section by an operator in accordance with a specific operating procedure. The apparatus of the Publication is therefore limited in productivity.

Furthermore, the aforementioned Publication proposing the film winding apparatus simply states that a film is wound on a spool by just turning a rotary shaft to rotate the spool, and does not include a description of any mechanism by which the rotary shaft is engaged with the spool. This means that the apparatus does not allow automatic engagement between the rotary shaft and the spool.

It is generally known that status of a film (e.g., unexposed, partly exposed, entirely exposed, or already developed) differs depending on the position of a spool in a cartridge. Moreover, the spool is not necessarily set in a convenient position (which indicates an empty cartridge) when rewinding the film. It is therefore essential that appropriate steps be taken to cope with improper positioning of the film.

SUMMARY OF THE INVENTION

It is an object of the present invention to provide a film winding apparatus which has overcome the problems residing in the prior art.

It is another object of the present invention to provide a film winding apparatus which can offer easy operation without requiring any special adjustment or treatment of a film or a cartridge and without causing any interference with a film winding mechanism, and assure single-unit construction and portability.

It is still another object of the present invention to provide a film winding apparatus which enables checking of a positional relationship between the film and cartridge.

It is yet still another object of the present invention to provide a film winding apparatus which can securely hook up a film in front of an opening of a cartridge.

It is a further object of the present invention to provide a film winding apparatus in which a motor provided for loading each cartridge does not exert an excessive force on a cartridge placed or mounted outside a main body of the apparatus or the motor automatically transfers such a cartridge up to a correct loading position inside the apparatus.

It is a still further object of the present invention to provide a film winding apparatus in which a rotating shaft for turning a spool of a cartridge is automatically engaged with the spool.

A film winding apparatus of the invention comprises a film winder provided in an apparatus housing for turning a spool housed in the cartridge to wind the film around the spool, a film feeder for feeding the film inserted through a film inlet which is located on one side of the apparatus housing toward the film winder, a cartridge mount provided on another side of the apparatus housing in such a way that the cartridge can be loaded on and unloaded from the cartridge mount at a cartridge loading position which is exposed to the outside of the apparatus housing, and a transporter for conveying the cartridge mount from the cartridge loading position up to the film winder, where the cartridge loaded on the cartridge mount is set in a film loading position.

In the film winding apparatus of the invention, it is easy to set and replace a film and a cartridge in the apparatus housing because the film is inserted through the film inlet located on one side of the apparatus housing while the cartridge is loaded on and unloaded from the cartridge mount provided on another side of the apparatus housing.

When the cartridge mount is drawn out of the film winder, an upright wall having a support pin for supporting the cartridge on one side is further extracted by as much as the length of the support pin. This arrangement facilitates removal of the cartridge from and loading of another cartridge on the cartridge mount.

The film winding apparatus may further comprise a first reader for reading film identification (ID) data marked on a film, a second reader for reading cartridge ID data marked on a cartridge loaded on the cartridge mount, and an indicator for displaying these ID data read by the first and second readers. This arrangement ensures that each film is reloaded into its original cartridge without physical interference due to dimensional mismatch between them, for instance, and serves to simplify overall design of the apparatus.

The film winding apparatus may be so constructed that activation of the transporter is inhibited in case of disagreement between the film identification data and cartridge identification data. This arrangement further ensures that each film is reloaded into its original cartridge.

The film winding apparatus may further comprise a forced loading control entering a command to forcibly wind the inserted film on the loaded cartridge and a forced loading device for disabling a loading inhibitor and activating the transporter. This makes it possible to wind a film on a non-original cartridge in a case where the original cartridge has been damaged or lost.

In one feature of the invention, the foremost end portion of the film is bent at a standby position in front of an opening of the cartridge and a hooking member hooks to a cutout in the film from its reverse side. With this arrangement, the hooking member approaches the bent portion of the film at a large angle so that the hooking member can hook to the cutout in the film in a reliable manner.

In another feature of the invention, the hooking member passes through the opening of the cartridge along an arc-shaped path and goes into the spool. Although the initial arc-shaped path of the hooking member insects the film surface almost parallel thereto at the standby position of the film in front of the opening of the cartridge, the film inserter shifts to the outside of the arc-shaped path at least from a point immediately before the hooking member hooks to the cutout in the film up to a point before the foremost end portion of the film guided through the opening of the cartridge is attached to the spool. This arrangement serves to increase the intersecting angle between the path of the hooking member and the film surface when the hooking member fits into the cutout in the film. The hooking member can therefore hook to the cutout in the film in a more reliable manner.

The transporter may include a loading mechanism capable of moving the cartridge, a motor for moving the loading mechanism and a torque limiter. The moving range of the loading mechanism can be easily limited by applying an external force to the loading mechanism or to the cartridge while it is being transported. The loading mechanism is not therefore subjected to a force exceeding a particular level.

In still another feature of the invention, a rotating shaft for turning the spool meshes with an interlocking end of the spool as it is if the orientation of the interlocking end matches the initial angular position of the rotating shaft. If, however, the orientation of the interlocking end does not match the initial angular position of the rotating shaft, the rotating shaft is pushed in a direction opposite to the spool and this situation is detected by a sensor. In this case, the rotating shaft is turned until it meshes with the interlocking end of the spool while preventing rotation of the spool by operating a driver controller. The rotating shaft can therefore be engaged with the interlocking end of the spool in a reliable manner.

There may be provided a rotating angle sensor for sensing the angle of rotation of the rotating shaft when it is rotated by the driver controller. It is possible to recognize the amount of angular displacement of the spool with this arrangement.

There may be further provided an angle indicator for displaying the angle of rotation of the rotating shaft sensed by the rotating angle sensor to the attention of an operator.

In yet another feature of the invention, the film feeder may be divided into lower and upper sections. This arrangement makes it easy to take corrective actions in case of film feeding errors, for instance, and to carry out inspection and maintenance of the apparatus. This also makes it possible to automatically feed the film when it is inserted into the film inlet.

These and other objects, features and advantages of the invention will become more apparent upon reading the following detailed description of the preferred embodiments with reference to the appended drawings.

BRIEF DESCRIPTION OF THE DRAWINGS

FIG. 9A is a side view of a film loading mechanism for hooking the foremost end of the film inside the cartridge;

FIG. 9B is a perspective view of a hooking plate;

FIGS. 10A and 10B are diagrams illustrating how the foremost end of the film is hooked inside the cartridge, wherein a film hooking assembly is in its home position in FIG. 10A while the film hooking assembly is in its hooking position in FIG. 10B;

FIG. 11 is a side view of a film winding drive mechanism for winding the film into the cartridge;

FIGS. 12A and 12B are diagrams illustrating how a contact member preset in accordance with specific positions of a planet gear operates, wherein an opening of the cartridge is opened and closed in FIG. 12A while the spool is locked in position for mounting the film in FIG. 12B;

FIG. 13 is a block diagram of the film winding apparatus of the embodiment; and

DETAILED DESCRIPTION OF THE PREFERRED EMBODIMENTS OF THE INVENTION

Figure 1:
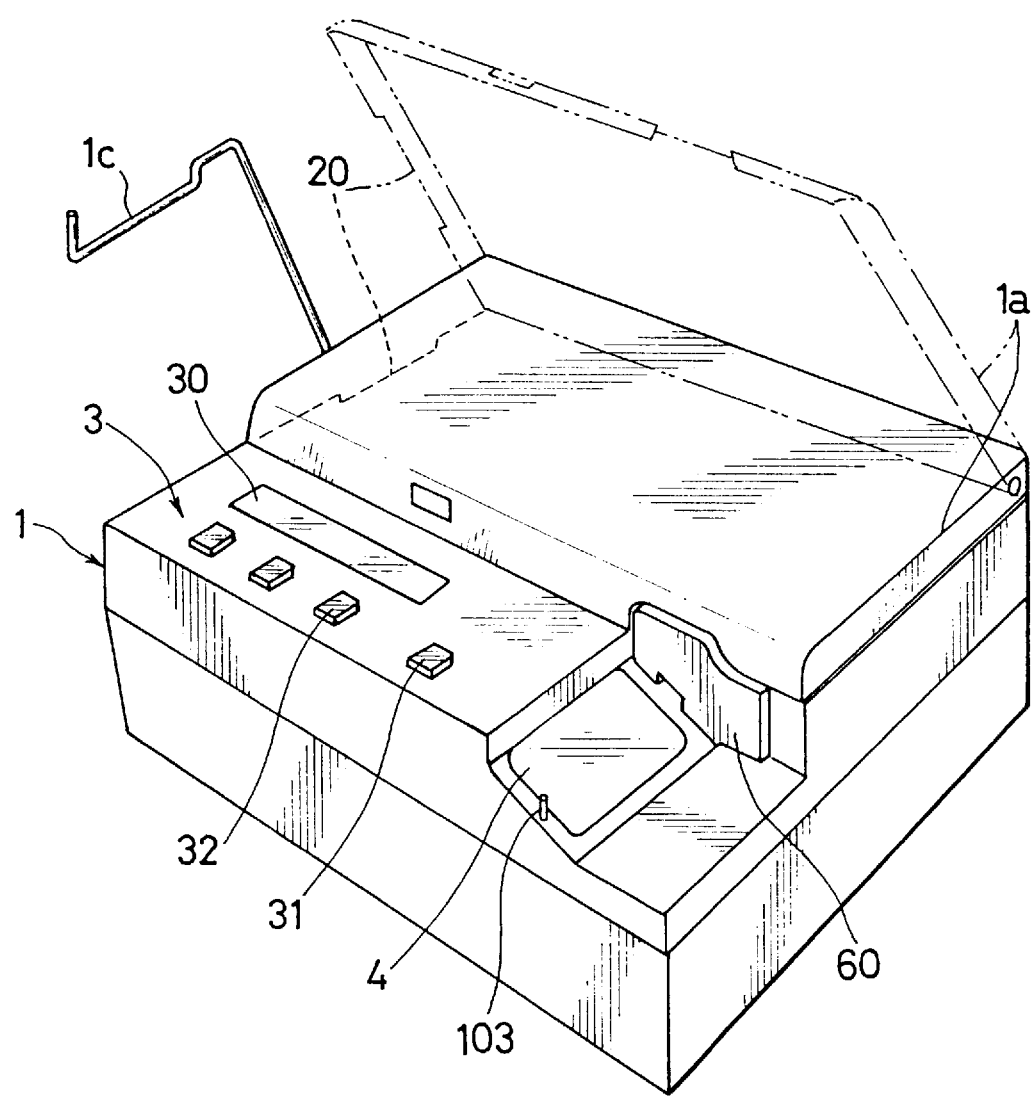
FIG. 1 is a perspective view generally illustrating a film winding apparatus according to a preferred embodiment of the invention.

FIG. 1 is a perspective view generally illustrating a film winding apparatus according to a preferred embodiment of the invention. This apparatus comprises a generally boxlike main body 1 and a top cover 1a which is attached swingably about a pivot axis located at the upper rear edge of the main body 1 to cover and expose part of its top surface. As will be described later in this Specification, upper and lower halves of a film feeding mechanism 2 are located on the top of the main body 1 and on the bottom of the top cover 1a, respectively, in mutually facing positions.

There is provided an operating panel 3 on the top surface of the main body 1 just in front of the portion covered by the top cover 1a. The operating panel 3 incorporates an indicator 30 employing a liquid crystal display (LCD) device, for instance, a SET button 31, a forced loading command button 32, and other necessary buttons. A front right portion of the top surface of the main body 1, immediately to the right of the operating panel 3, is made lower than the other part of the top surface, and an image sensor 4 is mounted at an appropriate position of this lower portion with a sensing surface of the image sensor 4 directed obliquely upward. The image sensor 4 comprises a light projector for emitting light containing at least infrared wavelength components, a charge-coupled device (CCD) optical sensor including a linear array or a two-dimensional array of photosensors, for instance, for outputting an electric signal corresponding to the amount of incident infrared light, and an infrared filter provided at the surface of the image sensor 4. The apparatus utilizes infrared light since the optical sensor of the image sensor 4 is exposed to the outside and is otherwise influenced by extraneous light including natural light.

A cartridge loading position is located just above the image sensor 4. As will be described later, a cartridge mount 5 is made movable back and forth by an internal slide mechanism 6 between the cartridge loading position outside the main body 1 and a film loading position inside the main body 1. In FIG. 1 the cartridge mount 5 is accommodated inside the main body 1 and only a front cover plate 60 can be seen from outside. The upper left edge of the main body 1 and the lower left edge of the top cover 1a are correspondingly cut out to form a film inserting port 20. A film F is entered through the film inserting port 20 and sent rightward between the main body 1 and the top cover 1a, as will be discussed later in detail. A guide bar 1c shown in FIG. 1 is for preventing jamming of a rear portion of the inserted film F.

Figure 2A:
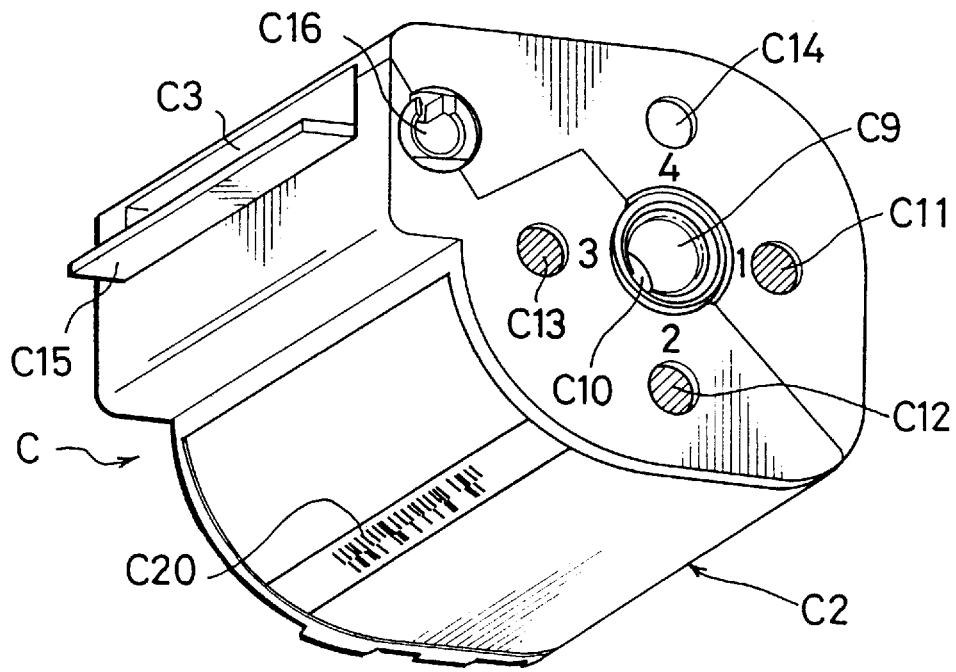
FIG. 2A is a perspective view of a cartridge applicable to the apparatus of the invention.
Figure 2B:
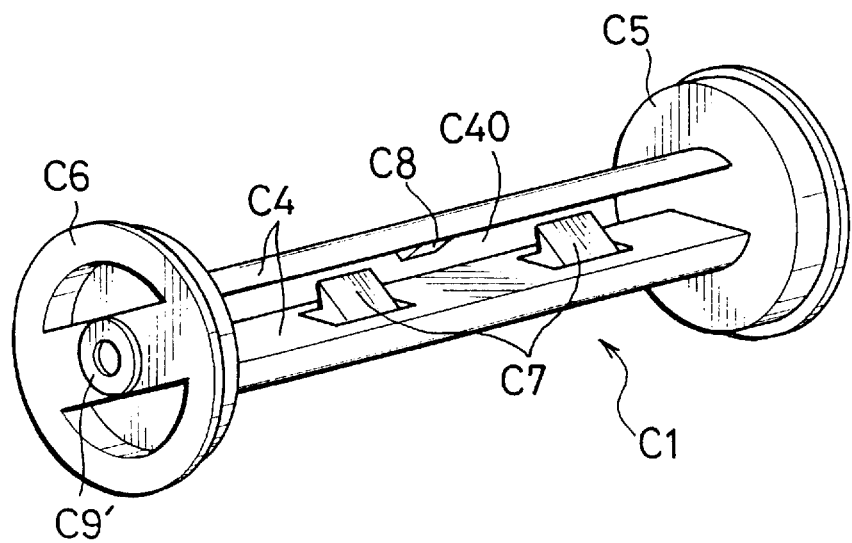
FIG. 2B is a perspective view of a spool housed in the cartridge shown in FIG. 2A.

FIG. 2A is a perspective view of a cartridge C applicable to the apparatus of the invention and FIG. 2B is a perspective view of a spool C1 housed in the cartridge shown in FIG. 2A.

The spool C1 having specified dimensions is positioned in the middle of an internal space of the cartridge C. The cartridge C includes a generally cylindrical light-tight housing C2 having closed ends, and a slitlike opening C3 extending in a longitudinal direction of the cartridge C is provided on the curved surface of the housing C2. The spool C1 mainly comprises a pair of generally platelike connecting members C4, which would be obtained as if by cutting away a central portion of a solid cylinder in the manner of an axial cross section, and disklike side members C5 and C6 attached to both ends of the pair of connecting members C4. These connecting members C4 form a slot C40 in between. A pair of spring-loaded stoppers C7 are provided on one connecting member C4. These stoppers C7 are symmetrically arranged in the longitudinal direction of the connecting member C4 on its inner surface and project into the slot C40. On the other hand, a spring-loaded retaining claw C8 projecting into the slot C40 is provided on an inner surface of the other connecting member C4 in the middle of its length. An outside surface of the side member C5 is divided by radii into a quarter-circle sector and a three-quarter-circle sector, wherein the three-quarter-circle sector is made identifiable by a different color, for example, from the quarter-circle sector. The side members C5 and C6 have at the central positions of their outside surfaces fixing holes C9 and C9' of specified diameters, respectively. In addition, a keyway C10 is formed in the fixing hole C9 in a specific angular position. Designated by the numeral C20 in FIG. 2A is a cartridge ID label which is affixed to a convenient site on the bottom side of the cartridge C and indicates information on the cartridge C (hereinafter referred to as cartridge ID data) by using a unique bar code number, for example. In a case where the cartridge ID data is marked in the form of bar codes, the aforementioned image sensor 4 functions as a bar code reader.

Four through holes C11–C14 arranged in the shape of a cross around the axis of the spool C1 are made in an end plate of the cartridge housing C2 where the side member C5 is located. FIG. 2A shows a condition in which the spool C1 is set in position "4". Relationships between individual positions of the spool C1 and statuses of the film F are defined as follows, for example: spool position "1" means that the film F is not exposed at all; spool position "2" means that the film F has been partly exposed; spool position "3" means that the entire film F has already been exposed; and spool position "4" means that the film F has already been developed or the cartridge C is empty. In this embodiment, the cartridge C shows spool position "4" if the film F has already been removed for development. The film F is pulled out or inserted through the slitlike opening C3 which is provided with a shield cover C15. The cover C15 is a plate member which is long enough to fit over the opening C3 and is secured by a rotary shaft (not shown) provided at the lower edge of the plate member. The cover C15 opens and closes the opening C3 by turning the rotary shaft in opposite directions, and when the opening C3 is closed, extraneous light is completely shut off. A rotary shaft C16 is supported by both end plates of the cartridge housing C2 and the opening C3 is opened and closed by turning the rotary shaft C16 from outside the cartridge C.

Figure 3:
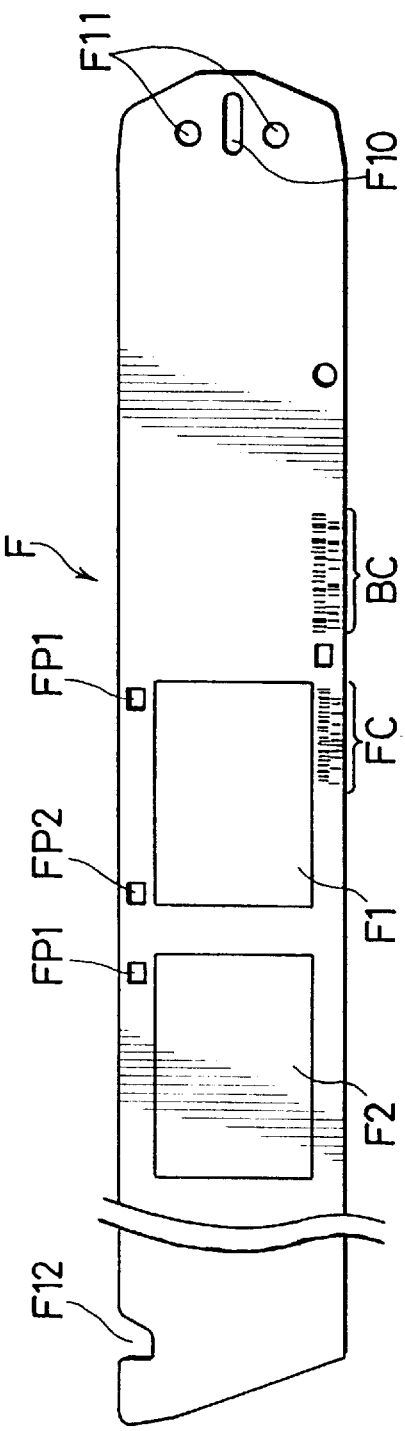
FIG. 3 is a plan view illustrating the shape of a film applicable to the apparatus of the invention.

FIG. 3 is a plan view illustrating the shape of the film F rewound by the apparatus of the invention.

The film F is of a standardized type which has specific width and length. A specific number of frames F1, F2, and so forth are arranged along the film F leaving a specified length of blank portion from its foremost end and perforations FP1 and FP2 are made in the film F corresponding in position to the individual frames.

Close to the foremost end of the film F there is made an oval-shaped first hole F10 extending lengthwise just in the middle of the film width associated with a pair of approximately circular second holes F11 located on both sides of the first hole F10. Provided along the upper and lower edges of the film F are magnetic or optical recording segments (designated FC in FIG. 3), in which photographic information can be recorded as coded data. There is also provided a recording segment for indicating information on the film F (hereinafter referred to as film ID data). In this embodiment, the film ID data is optically recorded in a bar code recording segment BC. As can be seen from FIG. 3, the film F has a notch F12 close to its rearmost end. The notch F12 is for hooking on a retaining member (not shown) provided immediately inside the opening C3 of the cartridge C when the film F has been fully wound back into the cartridge C. This arrangement ensures that the film F is easily pulled out without problems.

Figure 4:
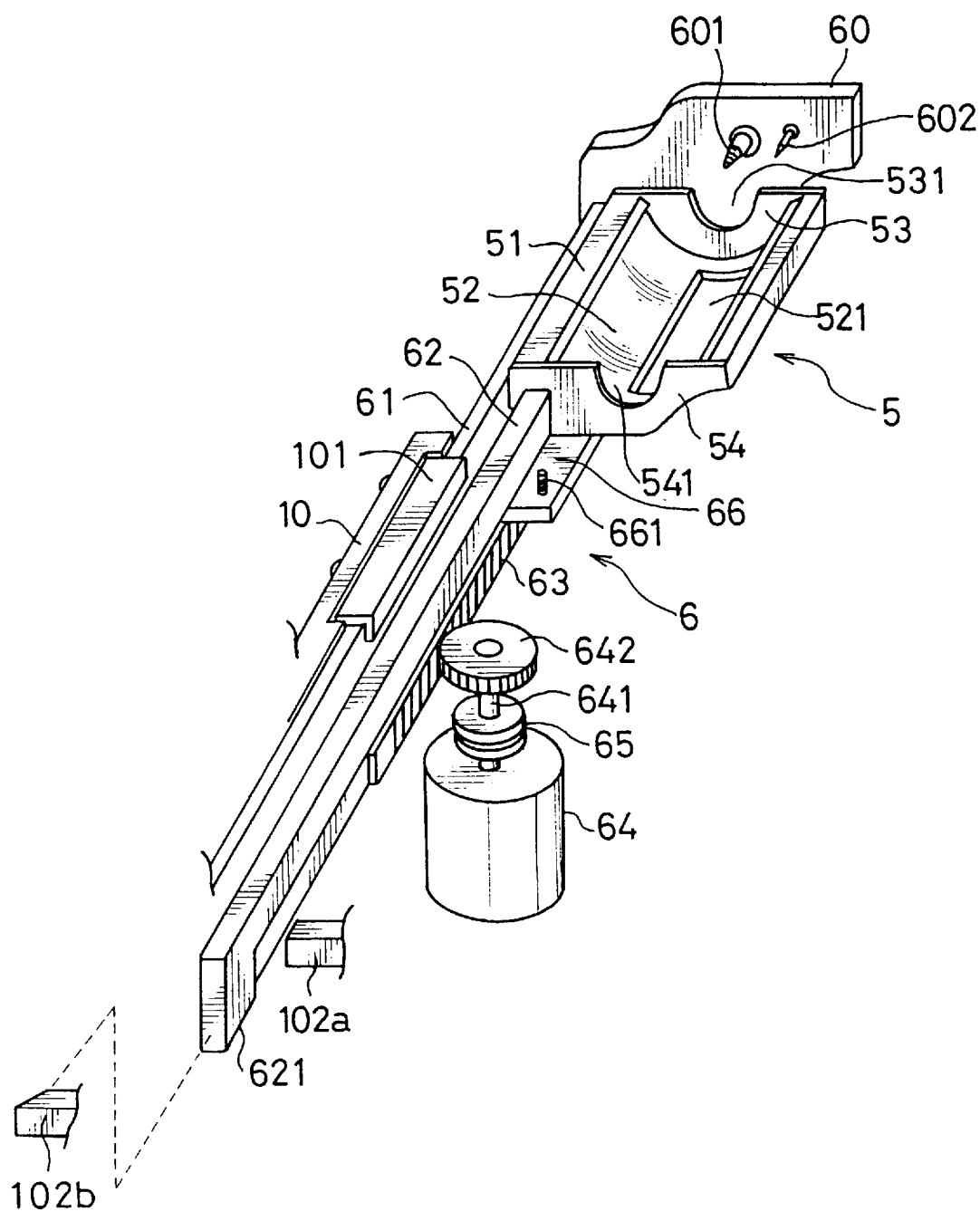
FIG. 4 is a perspective view illustrating a cartridge mount and its slide mechanism.
Figure 5:
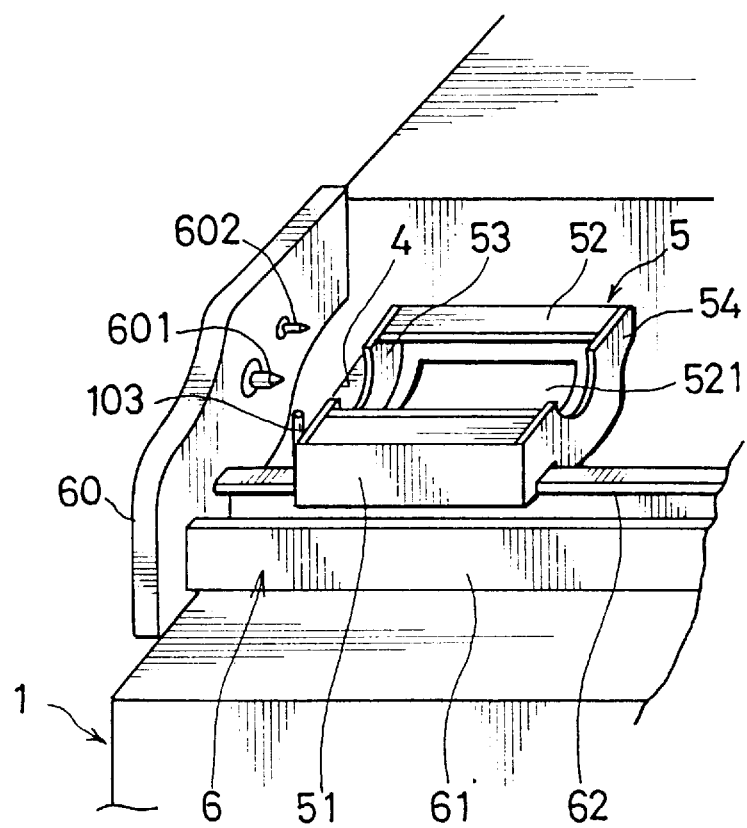
FIG. 5 is a perspective view illustrating a status in which the cartridge mount is located at a cartridge loading position.

FIG. 4 is a perspective view illustrating the cartridge mount 5 and the slide mechanism 6, and FIG. 5 is a perspective view illustrating a status in which the cartridge mount 5 is located at the cartridge loading position. As shown in these Figures, the cartridge mount 5 is mounted slidably with respect to the slide mechanism 6 and the slide mechanism 6 itself is also mounted slidably with respect to the main body 1 of the apparatus.

The slide mechanism 6 has the flat front cover plate 60 and a first slide bar 61 and a second slide bar 62 arranged parallel to each other are attached to the front cover plate 60. Directed at right angles to the front cover plate 60, these slide bars 61, 62 extend in a longitudinal direction of the main body 1 of the apparatus. A guide rail 101 having a generally U-shaped cross section and a specified length in the longitudinal direction is mounted on a frame member 10 of the main body 1. The U-shaped guide rail 101 incorporates ball bearings on its facing inside surfaces for slidably holding the first slide bar 61 in between.

A rack 63 is attached to the second slide bar 62 parallel to its longitudinal direction and a pinion gear 642 which meshes with the rack 63 is mounted to a rotating shaft 641 of a motor 64 for loading and unloading the cartridge C via a torque limiter 65. If the load imposed on the motor 64 exceeds a permissible level as it drives the slide mechanism 6, the torque limiter 65 absorbs the driving force of the motor 64 to prevent the driving force from being transmitted directly to the pinion gear 642. In other words, the torque limiter 65 protects the slide mechanism 6 and associated components from breakage due to overloading. A downward-projecting contact piece 621 is formed at an extreme forward end (lowermost end in FIG. 4) of the second slide bar 62. An outermost position (or fully drawn-out position) of the slide mechanism 6 is restricted as the contact piece 621 comes into contact with a stopper 102a provided at a convenient position in the main body 1 of the apparatus. Also when the slide mechanism 6 is retracted into the main body 1, the contact piece 621 comes into contact with a stopper 102b provided in the main body 1 to set the cartridge mount 5 in the film loading position. This arrangement also serves to ensure that the pinion gear 642 does not come off the effective range of the rack 63.

The motor 64 is a direct current (DC) motor, for example. The motor 64 is automatically stopped when the contact piece 621 comes into contact with the stopper 102a or 102b. This is done by detecting extreme positions of the motor 64 based on load variations or by means of contact sensors SE1, SE2 (shown in FIG. 13) such as limit switches and transmitting a detection signal. The driving force of the motor 64 is effectively absorbed by the torque limiter 65 during the period of time since a contact between the contact piece 621 and the stopper 102a or 102b has been detected until the motor 64 is stopped. The above-described construction serves to simplify circuit configuration since the slide mechanism 6 can be properly positioned without requiring complicated control circuitry.

A bottom plate 66 for slidably supporting the cartridge mount 5 is attached to the second slide bar 62 with a vertically projecting stopper pin 661 fixed to the bottom plate 66. The bottom plate 66 also serves as a reinforcing member for preventing deformation and breakage of the cartridge mount 5 and its surrounding components that may occur if an operator exerts an excessive force downward on the cartridge mount 5 when loading or removing a cartridge. One side (right side as illustrated in FIG. 4) of the cartridge mount 5 is formed into a generally U-shaped cross section. Ball bearings are mounted on facing inside surfaces of the U-shaped portion for slidably holding the first slide bar 61 in between. This U-shaped portion serves as a sliding groove 51 which enables the cartridge mount 5 to slide back and forth on the second slide bar 62 between front and rear limits which are determined by the front cover plate 60 and the stopper pin 661, respectively.

The cartridge mount 5 has a semicylindrical holder 52 and a front and rear plates 53, 54 located at both ends of the holder 52. The semicylindrical holder 52 is formed to fit the diameter of the cartridge C and a rectangular hole 521 extending in a longitudinal direction is made in the bottom of the holder 52. This hole 521 is provided so that the image sensor 4 located immediately beneath the cartridge C can read the cartridge ID data marked on the ID label C20 affixed to the cartridge C which is loaded in the holder 52. The front and rear plates 53 and 54 have semicircular cutouts 531 and 541, respectively, of which centers coincide with the axial center of a semicylindrical surface of the holder 52. In addition, the diameters of the semicircular cutouts 531 and 541 correspond to the diameters of the fixing holes C9 and C9' in the spool C1 of the cartridge C, respectively. The length of the holder 52 (as measured in its longitudinal direction) coincides with the length of the cartridge C, and the fixing holes C9 and C9' are supported at the cutouts 531 and 541 in the front and rear plates 53 and 54, respectively. With this construction, it is possible to properly position the cartridge C on the cartridge mount 5 with the spool C1 set in correct angular position.

There are fitted support pins 601 and 602 on the inside of the front cover plate 60. The support pin 601 is located in line with the axial center of the holder 52 and fits into the fixing hole C9 in the side member C5 of the spool C1. The support pin 602 is so located that it can fit into a hole in the rotary shaft C16 by which the cover C15 for opening and closing the opening C3 of the cartridge C is controlled. Furthermore, a vertically projecting stopper pin 103 is fitted at an appropriate position at the front of the image sensor 4 as shown in FIG. 1. This stopper pin 103 is so located that it goes into contact with the front plate 53 of the cartridge mount 5 when the cartridge mount 5 is separated from the front cover plate 60 by at least the lengths of the support pins 601 and 602 in a condition where the slide mechanism 6 is pulled out of the main body 1 but has not reached its fully drawnout position where the stopper 102a restricts its further frontward movement. The cartridge mount 5 loaded with the cartridge C is pushed by the stopper pin 103 and automatically comes off the support pins 601 and 602 when the slide mechanism 6 is drawn out. The cartridge C can then be easily removed from the cartridge mount 5 in this condition. On the other hand, this arrangement facilitates cartridge loading since the support pins 601 and 602 do not interfere with the cartridge C when loading it onto the cartridge mount 5.

The stopper pin 103 provided on the main body 1 and the stopper pin 661 provided on the slide mechanism 6 are just required to limit the movable range of the cartridge mount 5 in such a way that the cartridge mount 5 is moved on the bottom plate 66 by as much as the lengths of the support pins 601 and 602. The stopper pins 103 and 661 need not necessarily be "pins." Any other form of restricting members may be used as long as they can limit the movable range of the cartridge mount 5 in the same way as the stopper pins 103 and 661.

Figure 6:
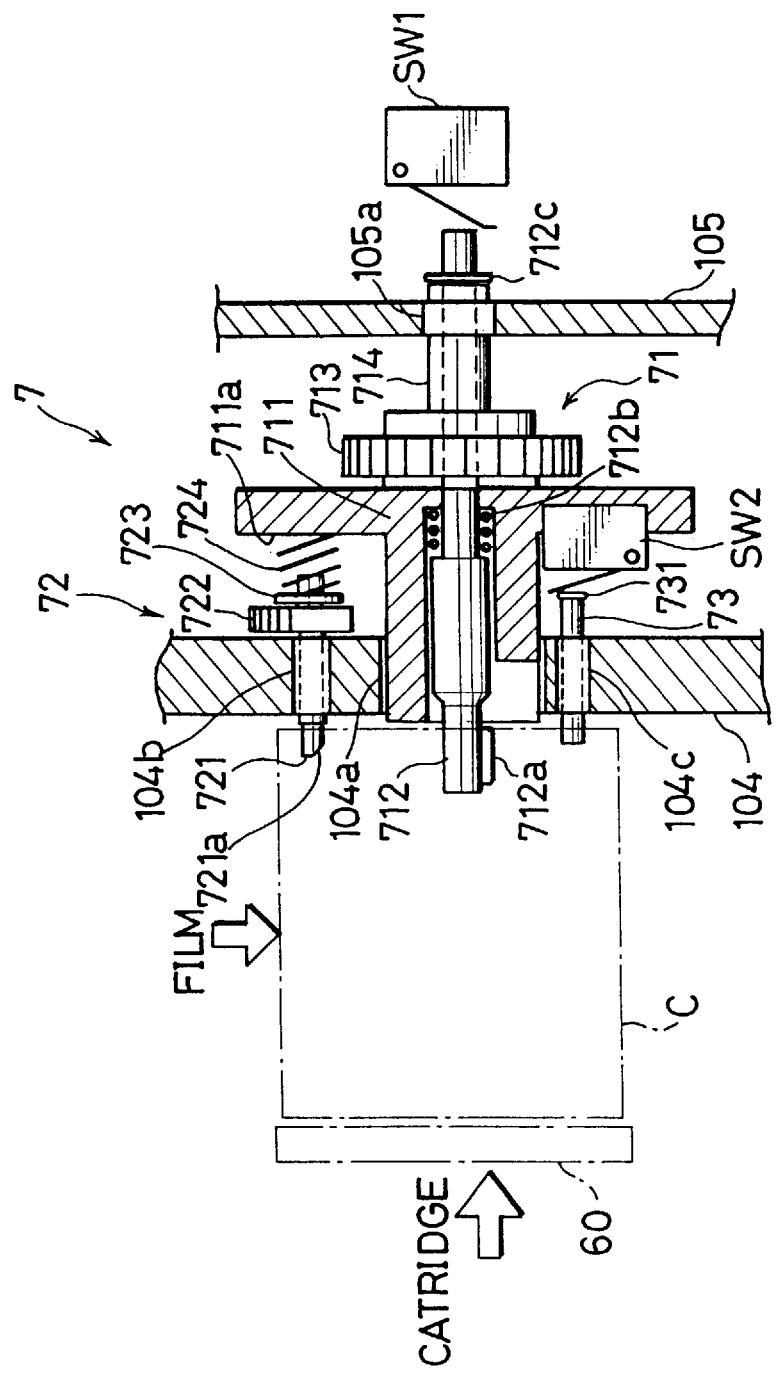
FIG. 6 is a cross-sectional plan view illustrating mechanical components in the vicinity of a film loading position.

FIG. 6 is a cross-sectional plan view illustrating mechanical components in the vicinity of the film loading position. Frame members 104 and 105 extending parallel to a lateral direction (vertical direction as illustrated in FIG. 6) of the main body 1 are installed with a specific distance between themselves and a film winding assembly 7 is mounted on these frame members 104 and 105. Alternate long and short dashed lines shown in front (left side in FIG. 6) of the frame member 104 indicate the film loading position. The cartridge C is held in this position by the front cover plate 60 as illustrated.

Three through holes 104a–104c are formed in the frame member 104 with a specific positional relationship among themselves. As can be seen from FIG. 6, a spool driving mechanism 71 is fitted into the through hole 104a, a cartridge open/close mechanism 72 is fitted into the through hole 104b, and a cartridge position sensing pin 73 for checking whether the cartridge C has been set to the correct film loading position is fitted into the through hole 104c.

The spool driving mechanism 71 includes a hollow, cylindrical boss 711 which is fitted into the through hole 104a, an elongate rotating shaft 712 which is passed through the boss 711 and can rotate about its own axis which aligns with the axis of the support pin 601, and a gear 713 which is mounted behind the boss 711 and rotates together with the rotating shaft 712. There is formed a projection 712a on a curved outer surface of the rotating shaft 712 close to its front end. As shown in FIG. 6 (also shown in FIG. 7), this projection 712a extends in a longitudinal direction of the rotating shaft 712. The rear end portion of the rotating shaft 712 passes through a cylindrical bearing 714 which is fitted into a hole 105a in the frame member 105 and an E-ring 712c is mounted over the rear end of the rotating shaft 712. This construction allows the rotating shaft 712 to slide back and forth in its longitudinal direction.

A large-diameter portion of the rotating shaft 712 is held in contact with a spring 712b which is accommodated inside the boss 711. The rotating shaft 712 is therefore forced frontward and its front portion projects to the front of the frame member 104. The amount of frontward projection of the rotating shaft 712 is made equal to the length of the aforementioned support pin 601. With this arrangement, the spool C1 is rotatably supported between the support pin 601 and the rotating shaft 712. The rotating shaft 712 and the gear 713 are joined together by fitting a portion of the rotating shaft 712 having a D-shaped cross section into a D-shaped through hole in the gear 713, for example, so that they can rotate together. With this joint structure, the bearing 714 maintains the gear 713 at a fixed position even when the rotating shaft 712 slides in its axial direction. This ensures that the gear 713 is held in mesh with counterpart.

A switch SW1 is fixed at a convenient position of the main body 1 near the rear end of the rotating shaft 712 for checking whether the spool C1 is set in an appropriate angular position. More specifically, the spool C1 loaded into this apparatus normally shows position "4". If, however, the spool C1 is not set to its normal position "4", the spool C1 does not match the angular position of the projection 712a on the rotating shaft 712 since the projection 712a is initially set to a direction corresponding to the spool position "4". In this case, the rotating shaft 712 does not fit into the spool C1 when the cartridge C is moved to the film loading position by the slide mechanism 6 so that the rotating shaft 712 is pushed rearward, causing the switch SW1 to turn on. In this embodiment, the gear 713 is rotated until the rotating shaft 712 fits into the spool C1 (or until the switch SW1 turns off) when the switch SW1 has turned on.

The cartridge open/close mechanism 72 includes a rotating shaft 721 which is rotatably fitted into the through hole 104b in such a way that the axis of the rotating shaft 721 aligns with that of the support pin 602, a gear 722 which is mounted close to the rear end of the rotating shaft 721 behind the frame member 104 and rotates together with the rotating shaft 721, and an E-ring 723 for preventing the gear 722 from coming off the rotating shaft 721. There is formed a projection 721a on a curved outer surface of the rotating shaft 721 close to its front end. As shown in FIG. 6 (also shown in FIG. 7), this projection 721a extends in a longitudinal direction of the rotating shaft 721. As will be further described later, the cover C15 fitted to the opening C3 of the cartridge C is opened and closed as the projection 721a is rotated by turning the rotating shaft 721. There is formed a flat wall 711a laterally extended from the rear end of the boss 711 to the rear of the through hole 104a, and a spring member 724 is placed between the E-ring 723 and the extended wall 711a. The rotating shaft 721 is therefore forced frontward so that it projects to the front of the frame member 104. The amount of frontward projection of the rotating shaft 721 is made equal to the length of the aforementioned support pin 602. With this arrangement, the rotary shaft C16 of the cartridge C is rotatably supported between the support pin 602 and the rotating shaft 721. The rotating shaft 721 and the gear 722 may be joined together by fitting a portion of the rotating shaft 721 having a D-shaped cross section into a D-shaped through hole in the gear 722, for example, so that they can rotate together and slide relative to each other. Since the rotating shaft 721 is made slidable in this manner, the rotary shaft C16 and components of the cartridge open/close mechanism 72 are protected from deformation and breakage even when the cover C15 is opened.

The cartridge position sensing pin 73 slidably is fitted into the through hole 104c and has a flange 731 formed at the rear end of the cartridge position sensing pin 73 for preventing it from dropping off the through hole 104c. The through hole 104c is formed at an appropriate position where the cartridge position sensing pin 73 goes into contact with an end plate of the cartridge C mounted on the cartridge mount 5. A switch SW2 is fixed at a convenient position of the main body 1 near the rear end of the cartridge position sensing pin 73 for checking whether the cartridge C has been properly loaded. The rear end of the cartridge position sensing pin 73 is in contact with a spring-loaded actuating lever of the switch SW2. Since the actuating lever forces the cartridge position sensing pin 73 frontward, it projects to the front of the frame member 104 when there is no cartridge C in the film loading position. When the cartridge mount 5 loaded with the cartridge C is brought up to the film loading position, the cartridge position sensing pin 73 is pushed rearward by the rear end plate of the cartridge C and causes the switch SW2 to turn on. A resultant signal makes it possible to confirm that the cartridge C has been set to the correct film loading position.

Figure 7:
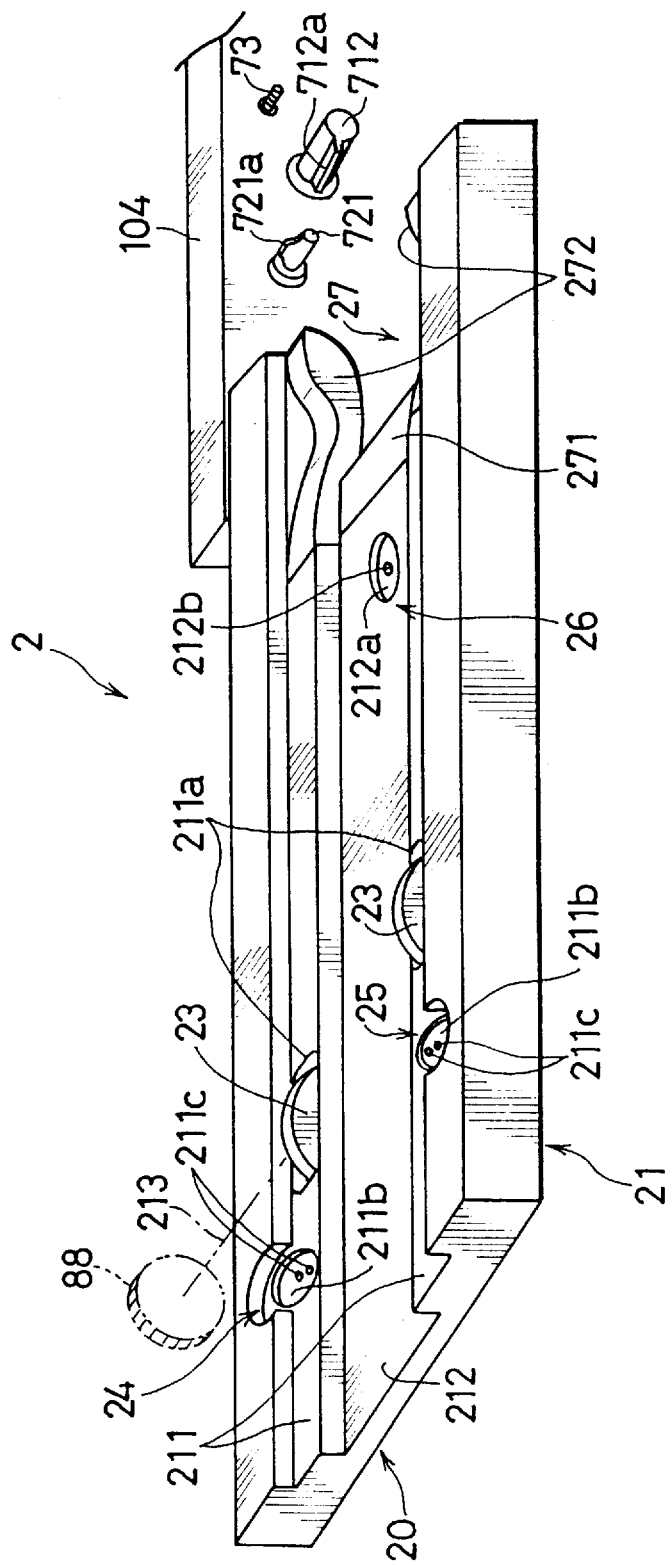
FIG. 7 is a perspective view illustrating an upper half of a film feeding mechanism installed on the top of a main body of the apparatus.
Figure 8:
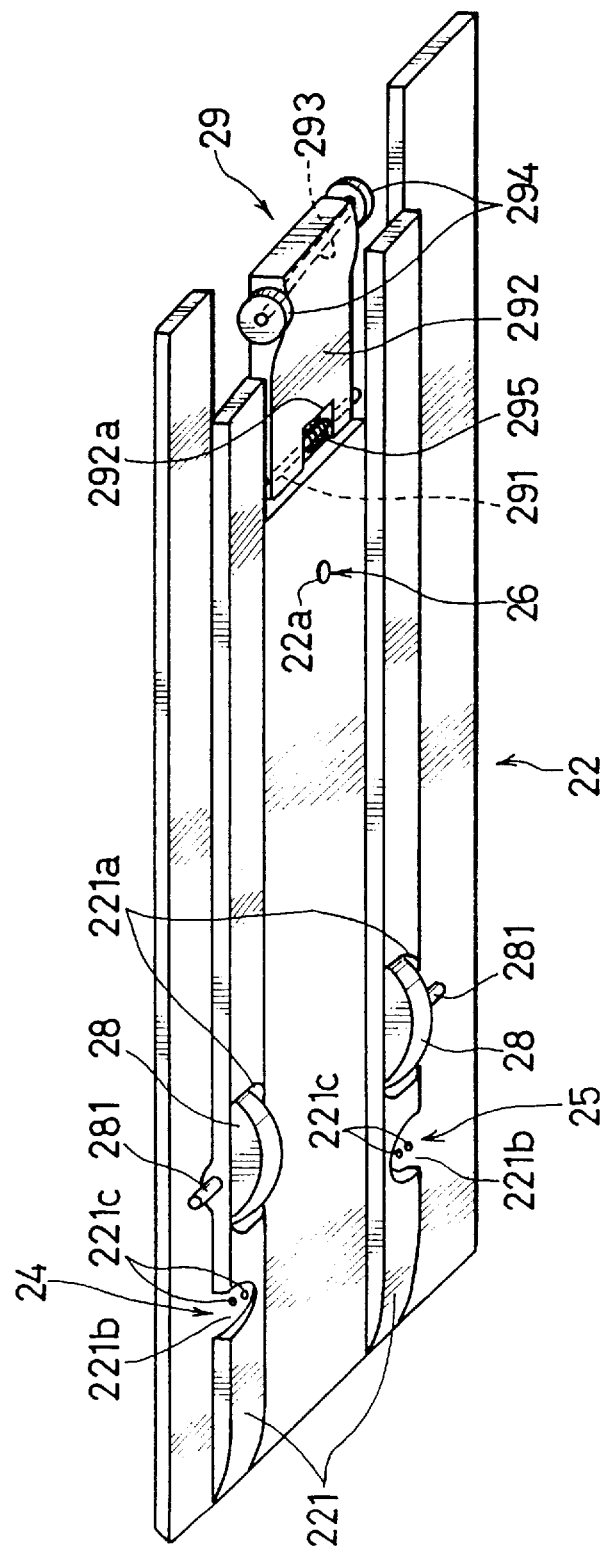
FIG. 8 is a perspective view illustrating a lower half of the film feeding mechanism installed on the bottom of a top cover of the apparatus.

FIGS. 7 and 8 are perspective views of the film feeding mechanism 2, in which FIG. 7 shows its upper half installed on the top of the main body 1 whereas FIG. 8 shows its lower half installed on the bottom of the top cover 1a.

The film feeding mechanism 2 comprises a lower guide 21 and an upper guide 22 and the earlier-mentioned film inserting port 20 is located between them. The lower guide 21 and upper guide 22 are elongate platelike members and are constructed to allow the film F to be supplied between their facing surfaces. Since the lower guide 21 and upper guide 22 can be easily set apart from each other by opening the top cover 1a, it is easy to take corrective actions in case of film feeding errors, for instance, and to carry out daily inspection and maintenance of the apparatus.

The lower guide 21 has double-stepped top surfaces, or stages, across its width. A middle elevation stage 211 of the lower guide 21 has an overall width equal to the width of the film F, and a lower stage 212 formed in the middle elevation stage 211 has a width equal to the width (as measured in a lateral direction of the film F) of each frame of the film F. The recessed lower stage 212 is provided to ensure that individual frame images recorded on the film F are not damaged while the film F is being fed through the film feeding mechanism 2. This double-stepped structure extends from an upstream end of the lower guide 21 in its longitudinal direction up to an appropriate position close to a downstream end of the lower guide 21. A pair of rectangular cutouts 211a are formed on both sides of the middle elevation stage 211 near its upstream end and a roller 23 supported by a horizontal shaft 213 (shown by an alternate long and short dashed line) aligned parallel to a lateral direction of the lower guide 21 is rotatably installed in each cutout 211a. As depicted in FIG. 7, a gear 88 (also shown in FIG. 9A) is mounted on the shaft 213.

Also provided on both sides of the middle elevation stage 211, immediately upstream of the cutouts 211a, are light projectors of photosensors 24 and 25. On the other hand, light receivers are mounted on the bottom of the upper guide 22 at positions corresponding to the light projectors as shown in FIG. 8. In this embodiment, the photosensor 24 is a perforation sensor while the photosensor 25 is an optical scanner for reading the film ID data marked on the film F.

The top surfaces of the middle elevation stage 211 are slightly recessed to form shallow pits 211b where the light projectors of the photosensors 24 and 25 are installed. A pair of small holes 211c aligned in the lateral direction of the lower guide 21 are formed in each pit 211b. Light beams produced by a pair of light-emitting devices installed in each pit 211b are projected through these small holes 211c onto the film F. A light-emitting device of a photosensor which constitutes part of a film detector 26 is installed in the middle of the width of the lower stage 212 close to its downstream end. On the other hand, a photosensitive device is mounted on the bottom of the upper guide 22 at a position corresponding to the light-emitting device of the film detector 26 as shown in FIG. 8. The top surface of the lower stage 212 is slightly recessed to form a shallow pit 212a at a position where the light-emitting device of the film detector 26 is installed. A small hole 212b is made in a surface of the pit 212a, and a light beam produced by a light-emitting device installed in the pit 212a is projected through this small hole 212b onto the film F.

Transparent glass pieces are fitted to the individual pits 211b and 212a to protect sensor elements from dust contamination. In this embodiment, the light projectors of the photosensors 24 and 25 each comprises a pair of light-emitting devices. This is because the film ID data is marked in two arrays of bar codes on each film F. If the film ID data is marked in a single array of bar codes, a single light-emitting device will suffice to read it.

The middle elevation stage 211 and the lower stage 212 of the lower guide 21 are made a little shorter than its outermost side portions (or uppermost stage) and a film guide 27 for guiding the film F extend in a downstream direction from the downstream ends of the middle elevation stage 211 and the lower stage 212. The film guide 27 includes a pair of guide members 272, each having a specified length and the same width as each side of the middle elevation stage 211, and a link plate member 271 which is made flush with the lower stage 212 and connects the guide members 272 to each other. Each guide member 272 is flush with the middle elevation stage 211 where the former connects to the latter. The top surface of each guide member 272 gradually slopes down from the level of the middle elevation stage 211 and then begins to rise halfway downstream to form a smoothly curved ascending slope, which ends with a slight upslope portion or a horizontal portion. A later discussion will deal with how these guide members 272 will work with reference to FIGS. 10A and 10B.

Referring to FIG. 8, a pair of elongate projections 221, each having the same width with each side of the middle elevation stage 211, are formed on the bottom of the upper guide 22 in such a way that the projections 221 face the individual sides of the middle elevation stage 211. A pair of rectangular cutouts 221a are formed in the projections 221 at positions corresponding to the rollers 23 installed in the lower guide 21 and a roller 28 supported by a horizontal shaft 281 aligned parallel to a lateral direction of the upper guide 22 is rotatably installed in each arc-shaped cutout 221a, with the roller 28 partly exposed downward from a bottom surface of each projection 221. When the top cover 1a is closed, the rollers 23 and rollers 28 come into mutual contact with the film F gripped in between.

Shallow pits 221b are formed in the projections 221 at positions corresponding to the individual pits 211b in the lower guide 21 and a pair of small holes 221c are formed in each pit 221b. The small holes 221c in each pit 221b are precisely aligned in the lateral direction of the upper guide 22 so that the light beams produced by the light-emitting devices installed in each pit 211b and passing through the small holes 211c enter the small holes 221c. A pair of photosensitive devices are installed just above the small holes 221c in each pit 221b. The film ID data marked on the film F is read when the photosensitive devices of the photosensor 25 receive the light beams from the facing light-emitting devices. It is determined whether the perforations FP1 and FP2 in the film F are in position or not depending on whether the photosensitive devices of the photosensor 24 receive the light beams from the facing light-emitting devices.

There is made a small hole 22a in the middle of the width of the upper guide 22 just at a position corresponding to the small hole 212b in the pit 212a formed in the lower guide 21, and the earlier-mentioned photosensitive device constituting part of the film detector 26 is installed just above the small hole 22a in the upper guide 22. Status of the film F is sensed by the light-emitting device and the photosensitive device of the film detector 26. More particularly, passages of the foremost end and rearmost end of the film F are detected as the photosensitive device of the film detector 26 senses the state of the light beam received from the light-emitting device while the film F is fed between the lower guide 21 and the upper guide 22.

A flat portion between the two projections 221 on the upper guide 22 is cut short at its downstream end so that this flat portion is shorter than its both sides. A film pressure assembly 29 is provided at a downstream cut part of the upper guide 22, where the film pressure assembly 29 is located just above the film guide 27. The film pressure assembly 29 includes a rotary shaft 291 of which both ends are supported at facing side surfaces of the downstream cut part of the upper guide 22, a swing plate 292 swingably mounted on the rotary shaft 291, and a pair of rollers 294 rotatably mounted on a rotary shaft 293 of which both ends extend sideways from a downstream end portion of the swing plate 292. A cutout 292a is made in the upstream edge of the swing plate 292 for exposing part of the rotary shaft 291, and a spring member 295 is mounted on the exposed part of the rotary shaft 291 for pushing the swing plate 292 downward at its upstream end portion. The spring member 295 thus mounted causes the rollers 294 to go into contact with the guide members 272 of the film guide 27 at their lowermost parts (or slightly downstream of the lowermost parts). When gripped between the rollers 294 and the guide members 272, the foremost end of the film F is directed slightly downward. This arrangement makes it easier to securely hook to the hole F10 in the film F by a later-described hooking plate 86 (shown in FIGS. 9A and 9B).

FIG. 9A is a side view of a film loading mechanism 8 for hooking the foremost end of the film F inside the cartridge C and FIG. 9B is a perspective view of the hooking plate 86. FIGS. 10A and 10B are diagrams illustrating how the foremost end of the film F is hooked inside the cartridge C, wherein a film hooking assembly 85 is in its home position in FIG. 10A, while the film hooking assembly 85 is in its hooking position in FIG. 10B.

Referring to FIG. 9A, the film loading mechanism 8 comprises a forward and reverse running motor 80 which is fixed to the main body 1 with its drive shaft 801 held in a horizontal position and a sun gear 811 which is mounted on the drive shaft 801 of the motor 80. An arm 82 is swingably mounted on the drive shaft 801 and a planet gear 812 which engages with the sun gear 811 is rotatably fixed at a far end of the arm 82. Stoppers 831 and 832 are provided to set a movable range of the arm 82 which swings about the drive shaft 801 in both the forward and reverse running directions of the motor 80. The stoppers 831 and 832 are so located that the planet gear 812 reaches extremes of its movable range when it meshes with a gear 813 and the later-described gear 88, respectively. The gear 813 is further engaged with a gear 814 and an eccentric cam 815 is securely fitted to a shaft of the gear 814. A switch SW3 is mounted close to the perimeter of the eccentric cam 815. The switch SW3 turns on when a projecting part 815a of the eccentric cam 815 comes into contact with a spring-loaded actuating lever of the switch SW3. In addition, one end of a crankshaft 84 is attached to an eccentric position on a circular side surface of the gear 814.

The film hooking assembly 85 includes a pivot 106 rotatably supported in a horizontal position between unillustrated frame members of the main body 1, a hooking plate retainer 851 which extends to a specific length at right angles to the page of FIG. 9A, and an elongate platelike swinging arm 852 which extends from behind the hooking plate retainer 851 in a direction perpendicular to the pivot 106 and rotates together with the pivot 106 and the hooking plate retainer 851. An oval-shaped hole 853 is made approximately in the middle of the hooking plate retainer 851, and the pivot 106 which is fixed to the main body 1 passes through this oval-shaped hole 853. The hooking plate retainer 851 is made slidable relative to the swinging arm 852 only in the direction of a long axis of the oval-shaped hole 853 (in side view). The hooking plate retainer 851 has an extended arm 854 of a specified length and a contact portion 855 jutting out in the direction of the swinging arm 852. The oval-shaped hole 853 is formed so that the long axis of its cross section is directed to the contact portion 855. A spring member 856 such as a compression spring is housed in the oval-shaped hole 853 to force the hooking plate retainer 851 in the direction of the contact portion 855 relative to the pivot 106. The other end of the crankshaft 84 is rotatably attached to an appropriate position on a circular side surface of the swinging arm 852. In addition, a contact member 107 is fixed to the main body 1 beneath the pivot 106.

The hooking plate 86 is fixed to the extended arm 854. As shown in FIG. 9B, the hooking plate 86 includes an arc-shaped plate portion 861, a pair of guide elements 862 extending from a downstream end of the plate portion 861 on both sides, and a claw 863 extending obliquely upward from the middle of the downstream end of the arc-shaped plate portion 861. The radius of curvature of the arc-shaped plate portion 861 of the hooking plate 86 is made equal to the distance between the axis of the pivot 106 and an outer end of the extended arm 854, and gaps between the claw 863 and the individual guide elements 862 are so arranged that they align with the holes F11 in the film F. Furthermore, the radius of curvature of the arc-shaped plate portion 861 of the hooking plate 86 and the length of the long axis of the oval-shaped hole 853 are such that a downstream extension of the arc-shaped surface of the plate portion 861 passes through both the opening C3 of the cartridge C and the slot C40 in the spool C1 as shown in FIGS. 10A and 10B.

How the film loading mechanism 8 loads the film F into the cartridge C is now described with reference to FIGS. 9A, 9B, 10A and 10B.

In FIG. 10A, the hooking plate 86 is located in its home position, where the switch SW3 is on. In this condition, the film F is advanced until its foremost end is gripped between the rollers 294 and the guide members 272 and directed slightly downward. At this point, the motor 80 begins to rotate counterclockwise. This causes the arm 82 to turn counterclockwise and the planet gear 812 to mesh with the gear 813 so that the gear 814 rotates clockwise. As a result, the film hooking assembly 85 turns clockwise around the pivot 106 and the hooking plate 86 moves toward the foremost end of the film F along a generally arc-shaped path shown by an alternate long and two short dashed line in FIG. 10. When the film hooking assembly 85 reaches a position where the contact portion 855 comes into contact with the contact member 107, the film hooking assembly 85 is lifted up as shown in FIG. 10B against a downward force exerted by the spring member 856. The hooking plate 86 is temporarily lifted up just while the contact portion 855 is in contact with the contact member 107, as shown by a small arc-shaped projecting portion in the alternate long and two short dashed line. When the hooking plate 86 is lifted upward, the claw 863 fits into the hole F10 in the film F from underneath at a large inserting angle. Since the foremost end of the film F is directed slightly downward and the claw 863 is moved upward when the hooking plate 86 is lifted, the inserting angle of the claw 863 becomes large. With this arrangement, the claw 863 hooks to the hole F10 in the film F in a reliable manner.

As the film hooking assembly 85 is rotated further clockwise, the contact portion 855 is released from the contact member 107 and the hooking plate 86 returns to its initial large-diameter arc-shaped path. While the hooking plate 86 is returning to its initial arc-shaped path, the claw 863 moving obliquely downward aligns with the opening C3 of the cartridge C and enters the cartridge C. Since the hooking plate 86 enters the cartridge C at an oblique angle from above the initial arc-shaped path, it is possible to properly guide the foremost end of the film F through the opening C3 without touching its lower edge even when the foremost end of the film F is a little bent or curled downward. After passing through the opening C3 of the cartridge C, the hooking plate 86 further advances along its initial arc-shaped path up to a specific angular position, where the claw 863 and the foremost end of the film F are located together in the slot C40 in the spool C1. Then, the stoppers C7 of the spool C1 fit into the holes F11 in the film F. The foremost end of the film F is guided into the cartridge C and mounted therein in this manner. The numbers of teeth of the individual gears of the film loading mechanism 8 are so determined that the left-hand end of the crankshaft 84 is located at the most distant point from the hooking plate 86 at this point. Therefore, when the motor 80 rotates further, the turning direction of the hooking plate 86 is reversed so that it is retracted from the slot C40 back to the home position. The switch SW3 causes the motor 80 to stop upon detecting the projecting part 815a of the eccentric cam 815 and sets the hooking plate 86 in its home position.

Referring to FIG. 9A, when the motor 80 rotates clockwise, the arm 82 also turns clockwise and the planet gear 812 meshes with the gear 88 so that a clockwise driving force is transmitted to the gear 88. Therefore, the rollers 23 linked to the gear 88 rotate clockwise, as illustrated in FIG. 7, and the film F is fed downstream. The aforementioned arrangement makes it possible to feed the film F and mount it to the cartridge C by the single motor 80, resulting in simplification of equipment construction. In addition, since the driving source (motor 80) for feeding the film F is disengaged from the rollers 23 while the film F is being wound, it is no longer necessary to synchronize the revolving speed of the rollers 23 in accordance with the film winding speed which increases as the diameter of the rolled portion of the film F increases during film winding operation.

FIG. 11 is a side view of a film winding drive mechanism 9 for winding the film F into the cartridge C.

The film winding drive mechanism 9 comprises a forward and reverse running motor 90 which is fixed to the main body 1 with its drive shaft 901 held in a horizontal position and a sun gear 911 which is mounted on the drive shaft 901 of the motor 90. An arm 92 is swingably mounted on the drive shaft 901 and a planet gear 912 which engages with the sun gear 911 is rotatably fixed at a far end of the arm 92. Stoppers 931 and 932 are provided to set a movable range of the arm 92 which swings about the drive shaft 901 in both the forward and reverse running directions of the motor 90. The stoppers 931 and 932 are so located that the planet gear 912 reaches extremes of its movable range when it meshes with a gear 913 and the earlier-described gear 713, respectively.

A rotary disk 914 of an encoder is connected to the gear 713 in such a way that the rotary disk 914 rotates together with the gear 713. A light-shielding projection 914a is provided along half the circumference of the rotary disk 914. This light-shielding projection 914a is detected by a rotary position sensor 94 such as a photosensor including a light-emitting device and a photosensitive device, between which the light-shielding projection 914a passes. Leading and trailing edges of the light-shielding projection 914a are preset to such angular positions that an initial angular position of the rotating shaft 712 and the slot C40 of the spool C1 are directed to the opening C3 of the cartridge C.

A pin 913a is mounted at an eccentric position on a circular side surface of the gear 913. A swinging arm 95 having a specified length is swingably supported by a horizontal pivot 108, which is fixed to the main body 1, at one end. A slot 951 is formed in a longitudinal direction of the swinging arm 95 in its swinging side. The pin 913a is fitted into the slot 951 in the swinging arm 95. A fan-shaped gear 96 is formed at the fixed end of the swinging arm 95 and this gear 96 meshes with the gear 722 which drives the cartridge open/close mechanism 72. Switches SW4 and SW5 are located at positions corresponding to extremes of a movable range of the swinging arm 95. When the swinging arm 95 swung by the gear 913 reaches its extreme angular positions, these switches SW4 and SW5 detect it. The extreme angular positions of the swinging arm 95, which correspond to opened and closed positions of the opening C3 of the cartridge C, are determined in accordance with the diameter of the gear 96.

When the motor 90 rotates clockwise, the arm 92 also turns clockwise and the planet gear 912 meshes with the gear 713 so that the gear 713 rotates clockwise. As a result, the spool C1 is rotated in its film winding direction. On the contrary, when the motor 90 rotates counterclockwise, the arm 92 also turns counterclockwise and the planet gear 912 meshes with the gear 913. As a result, the gear 96 is moved in its reciprocating directions to operate the cover C15 of the cartridge C for opening and closing its opening C3 in a controlled manner. This arrangement makes it possible to control open/close operations of the opening C3 of the cartridge C and film winding operation by the single motor 90, resulting in simplification of equipment construction.

FIGS. 12A and 12B are diagrams illustrating how a contact member 97 preset in accordance with specific positions of the planet gear 912 operates, wherein the opening C3 of the cartridge C is opened and closed in FIG. 12A while the spool C1 is locked in position for mounting the film F in FIG. 12B.

The contact member 97 is mounted on the pivot 106 for supporting the film hooking assembly 85 shown in FIG. 9A so that the contact member 97 rotates together with the pivot 106. The contact member 97 has generally a cylindrical shape, and approximately half the circumference of an end of the contact member 97 extends to form a semicylindrical contact surface 971. The contact surface 971 of the contact member 97 is directed upward (FIG. 12A) when the film hooking assembly 85 is in its home position. When the film hooking assembly 85 is activated and the hooking plate 86 enters the cartridge C, the contact surface 971 is directed downward (FIG. 12B) as a result of rotation of the pivot 106. As shown in FIG. 12B, a movable limit of the planet gear 912 is set at a position where a pivot 912a of the planet gear 912 comes into contact with the contact surface 971 of the contact member 97. It will be understood from the above discussion that the pivot 912a of the planet gear 912 can not swing further as the pivot 912a comes into contact with the contact surface 971 when the spool C1 is locked in position for mounting the film F in FIG. 12B. Therefore, even when the hooking plate 86 which has entered the cartridge C goes into contact with either stopper C7, exerting a turning force on the spool C1, the spool C1 remains locked in position without rotating.

FIG. 13 is a block diagram of the film winding apparatus of the present embodiment.

Designated by the numeral 120 is a controller such as a microcomputer for managing overall operation of the apparatus. A power switch 110 provided at an appropriate position of the apparatus turns it on and off. Pressing the SET button 31 causes the image sensor 4 to read the cartridge ID data marked on the cartridge C. The forced loading command button 32 is used for forcibly loading a cartridge C into the film loading position if any discrepancy is found between cartridge ID data read by the image sensor (cartridge ID reader) 4 and film ID data read by the photosensor (film ID reader) 25.

The photosensor (perforation sensor) 24 is for determining the length of an already wound portion of the film F by successively detecting the perforations FP1 and FP2 marked on the film F. The film detector 26 detects the foremost end of the film F while it is being fed through the film feeding mechanism 2. When the foremost end of the film F has been detected, the film F is further fed by a specified length and stopped to precisely set its foremost end at a downslope position of the guide members 272. The film detector 26 also serves to judge that a film feeding error has occurred if the foremost end of the film F is not detected after a specified period of time has elapsed. The LCD employed in the indicator 30 has two rows of display segments, for instance, to display the cartridge ID data and film ID data in the individual rows. The indicator 30 may be used to display a message requesting replacement or forced loading of the cartridge C in a case where a comparison between the cartridge ID data and film ID data reveals any discordance.

The overall operation of the film winding apparatus is now described in a step-by-step manner.

When the power switch 110 is turned on, the apparatus is energized and a startup sequence is executed to set the apparatus in a ready-to-operate condition. The startup sequence involves initialization of the controller 120, resetting of the film hooking assembly 85 to its home position, resetting of the gear 722 to a position where the opening C3 of the cartridge C is closed, initial setting of the gear 713 at an angular position corresponding to spool position "4", and so forth.

When the startup sequence has finished, an operator closes the top cover 1a of the apparatus and inserts a developed film F or loads a cartridge C. In the following discussion it is assumed that the operator inserts a developed film F at first. The operator inserts the foremost end of the film F into the film feeding mechanism 2 through the film inserting port 20. When the foremost end of the film F goes beyond the perforation sensor 24 and reaches at least a point where the film F is gripped between the rollers 23 and 28, the perforation sensor 24 detects the film F. Then, the motor 80 begins to rotate clockwise and turns the rollers 23 via the gear 88. At this point, the apparatus begins to automatically take in the film F further into its main body 1.

The motor 80 is stopped after a specified period of time has elapsed, or after a specified number of driving pulses have been transmitted, since the film detector 26 has detected the foremost end of the film F. Stop timing of the motor 80 is controlled so that the foremost end of the film F is gripped between the 272s and 294s when the motor 80 comes to rest. The film ID reader 25 scans the film ID data recorded in the bar code recording segment BC of the film F while the film F is being transported by the motor 80, and the film ID data is displayed in the first row of display segments of the LCD indicator 30, for instance. If loading of the cartridge C is already finished at this point, the motor 80 drives the gear 88 in succession to hook the holes F11 in the foremost end portion of the film F onto the stoppers C7 located in the slot C40 in the spool C1 of the cartridge C. If loading of the cartridge C is not finished yet, the apparatus is set to a standby condition. This situation occurs when the status of the cartridge opening C3 and/or correct positioning of the spool C1 in the cartridge C has not been verified yet.

A cartridge loading sequence is now described in the following. When the power switch 110 is turned on, the slide mechanism 6 is comes out to the front of the apparatus and the cartridge mount 5 is set to the cartridge loading position. The operator places the cartridge C on the cartridge mount 5. When the cartridge C is loaded in a proper orientation, the ID label C20 faces the image sensor 4 underneath.

If the SET button 31 is pressed in this condition, the image sensor 4 scans the cartridge ID data marked on the cartridge C and the film ID data is displayed on the second row of display segments of the LCD indicator 30, for instance. The cartridge ID data and film ID data are stored in a cartridge ID memory 121 and film ID memory 122, respectively, and then compared with each other in a comparator 123. If the cartridge ID data and film ID data agree with each other, the motor 64 is activated and the cartridge C is moved toward the film loading position inside the main body 1 of the apparatus. If the ID data disagree, however, a relevant message is displayed on the indicator 30 and activation of the motor 64 is inhibited. In this case, the operator replaces the cartridge C and presses the SET button 31 to initiate again the aforementioned sequence. Alternatively, the operator presses forced loading command button 32 to forcibly activate the motor 64 so that the already loaded cartridge C is brought to the film loading position inside the main body 1.

In one varied form of the embodiment, the slide mechanism 6 may be of a manually operated type, in which a warning is generated if the ID data disagree, or a restricting member for preventing the cartridge mount 5 from being retracted into the main body 1 is set to an interfering position. This variation of the apparatus may be so constructed that the restricting member is withdrawn from the interfering position when the forced loading command button 32 is pressed.

The cartridge mount 5 is then transferred to the film loading position by the motor 64 and the cartridge mount 5, and when the cartridge mount 5 approaches the film loading position, it is judged whether the switch SW2 has been turned on by the cartridge position sensing pin 73. If the switch SW2 remains in an off state, the controller 120 judges that no cartridge C is loaded on the cartridge mount 5 and shows a relevant message on the indicator 30. If the switch SW2 turns on, the controller 120 judges that the cartridge C is loaded on the cartridge mount 5 and checks on/off status of the switch SW1. The support pins 601 and 602 are fitted into the fixing hole C9 and the hole in the rotary shaft C16 at this point.

Since the opening C3 of the cartridge C is normally closed when the cartridge C is loaded onto the cartridge mount 5, the rotating shaft 721 can fit into the cartridge C. Since the spool C1 is normally expected to be set to position "4" at this point, the rotating shaft 712 can fit into the fixing hole C9' of the spool C1 so that the switch SW1 remains in an off state. If the spool C1 is set to other than position "4", however, the switch SW1 becomes on and the controller 120 causes the motor 90 to rotate clockwise (FIG. 11) until the switch SW1 becomes off. The controller 120 examines how much the rotating shaft 712 is rotated until the switch SW1 becomes off and determines the spool position based on the angle of rotation of the rotating shaft 712. Since the opening C3 of the spool C1 is closed, or rotation of the spool C1 is inhibited, when the rotating shaft 712 is rotated, the spool C1 does not rotate even when the rotating shaft 712 is rotated with the rotating shaft 712 pressed against the fixing hole C9'. It is therefore possible to precisely determine the spool position.

If the spool position is "1", "2" or "3", the film F in the cartridge C is not exposed at all, partly exposed, or entirely exposed but not developed yet. In any case, the film F is still housed in the cartridge C so that the controller 120 judges that the cartridge C is unsuitable for winding a developed film and gives a relevant message on the indicator 30. If the spool position is "4", the controller 120 initiates a process of setting the spool C1 to a proper direction, or angular position, to allow the foremost end of the film F to be guided into the slot C40 (FIGS. 10A and 10B). First, the controller 120 causes the motor 90 to rotate counterclockwise from a position where the switch SW4 is on and the opening C3 of the cartridge C is closed up to a position where the switch SW5 is on and the opening C3 of the cartridge C is open, to enable the spool C1 to rotate. Then, the controller 120 causes the motor 90 to rotate clockwise until an output of the rotary position sensor 94 of the encoder changes from ON to OFF (or from OFF to ON) to set the spool C1 in an angular position where the foremost end of the film F matches the slot C40.

At this point, the controller 120 causes the motor 80 to rotate counterclockwise so that the film hooking assembly 85 swings about the pivot 106 and the hooking plate 86 turn along the generally arc-shaped path shown in FIGS. 10A and 10B. As a result, the foremost end of the film F is hooked onto the stoppers C7 and the film hooking assembly 85 returns to its home position together with the hooking plate 86. During this film hookup operation, the contact surface 971 of the contact member 97, which is firmly fixed to and rotates together with the pivot 106, is kept in contact with the pivot 912a of the planet gear 912 to prohibit rotation of the spool C1. This prevents the spool C1 from deviating from its set angular position even when the hooking plate 86 or the film F hits against the spool C1.

When the film hooking assembly 85 has been returned to its home position, or the foremost end of the film F has been hooked by the stoppers C7 in the slot C40 of the spool C1 inside the cartridge C, the motor 90 is caused to rotate counterclockwise to begin winding up the film F around the spool C1. While the film F is being wound, the gear 88 is kept disengaged from the planet gear 812 so that the film winding speed does not vary (increase) regardless of an increase in the diameter of the rolled portion of the film F.

The above-described film winding operation is terminated when the rolled length of the film F determined based on an output of the perforation sensor 24 reaches a specified value, or when the time elapsed after the rearmost end of the film F has been detected reaches a specified value. Since the spool C1 should be set to position "4" when the film F has been fully wound, the motor 80 is stopped when the spool C1 comes to its home position based on an output of the rotary position sensor 94 of the encoder. When the film detector 26 has detected the rearmost end of the film F, the motor 80 is switched to a lower running speed, for example, so that the notch F12 of the film F hooks on the retaining member provided immediately inside the opening C3 of the cartridge C with a reduced impact force, thereby making it certain that the film F can be pulled out of the cartridge C in a reliable manner at a later time.

Although various system statuses are visually displayed on the indicator 30 in the foregoing embodiment, verbal messages or audible warnings may be produced instead of or in addition to the visual indications.

Furthermore, although the film inserting port 20 is provided on the left side of the main body 1 and the cartridge mount 5 at the front right position of the main body 1 in the embodiment, they may be provided at any convenient positions as long as the film F can be properly fed and the cartridge C can be guided to an internal film loading position. As an example, the film F and the cartridge C may be loaded from opposite sides or any side faces of the main body 1.

Figure 14:
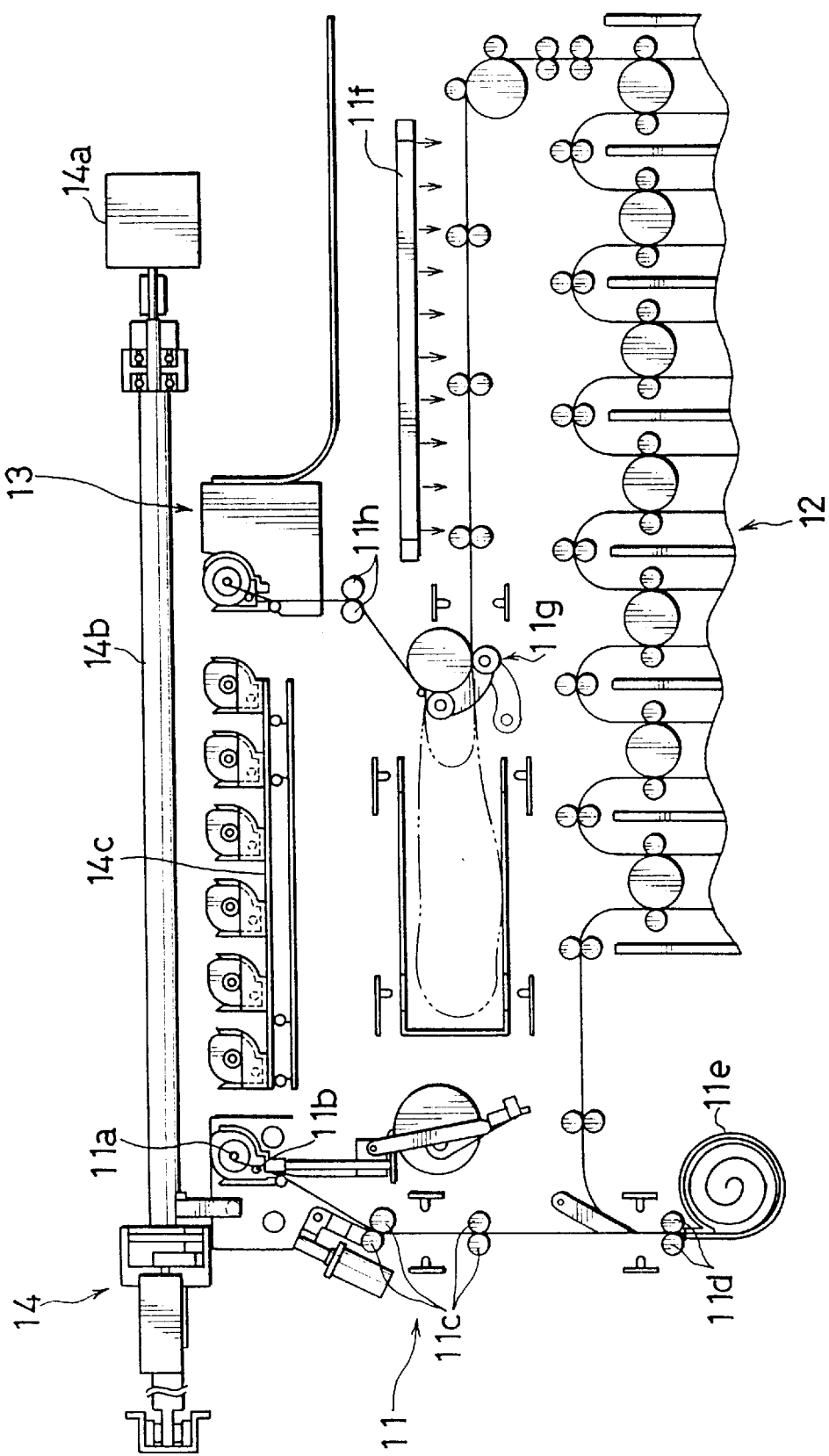
FIG. 14 is a side view illustrating the construction of an automatic film developing machine according to the invention.

FIG. 14 is a side view illustrating the construction of an automatic film developing machine according to the invention.

The automatic film developing machine comprises a film pull-out device 11 for pulling out an exposed film F which is rolled around a spool C1 in a cartridge C, a developing section 12 for developing the exposed film F, a film winding unit 13 for winding the developed film F into the cartridge C and a cartridge carrier 14 for conveying the cartridge C from the film pull-out device 11 up to the film winding unit 13. The film winding apparatus of the invention is incorporated as the film winding unit 13 in the automatic film developing machine.

In this automatic film developing machine, the cartridge carrier 14 moved by a drive motor 14a along a slide rail 14b grips one of cartridges C loaded on a rack 14c and sets it in the film pull-out device 11. Drive shafts 11a and 11b are inserted into the spool C1 and the opening C3 of the cartridge C set in the film pull-out device 11, the opening C3 is opened and, then, the spool C1 is rotated in a film unrolling direction to send an outer end of the film F out of the cartridge C. The film F is transferred by pairs of rollers 11c and 11d and into a film magazine 11e and, then, the film F is guided to the developing section 12 in a reverse direction.

The developing section 12 comprises a developer solution tank, a bleaching solution tank, a fixer solution tank and a stabilizer solution tank. The film F is developed as it is sequentially guided through these tanks and dried by a heater 11f. The dried film F is further guided through a loop former 11g and a pair of rollers 11h up to the film winding unit 13. As previously mentioned, the film winding speed increases as the diameter of the rolled portion of the film F increases. The film feeding rollers 11h are deenergized, or idled, during film winding operation since it is difficult to synchronize their revolving speed with the increasing film winding speed. The loop former 11g loops the film F to provide for an excess feed length while the film F is being advanced by rollers in the heater 11f. The foremost end of the film F is inserted into the film inserting port 20 (shown in FIG. 1) of the film winding unit 13 and advanced up to a position where the foremost end of the film F is gripped between the rollers 23 and 28 shown in FIGS. 7 and 8. On the other hand, the cartridge C from which the film F has been removed is transported by the cartridge carrier 14 to the top of the film winding unit 13 and mounted on the cartridge mount 5.

As can be seen from FIG. 14, the film winding unit 13 of this embodiment is installed so that its film inserting port 20 is directed downward. The film winding apparatus of the foregoing embodiment can be modified in such a way without departing from the spirit of the invention. In this modified form of the film winding apparatus, the cartridge mount 5 is so constructed that the cartridge C can be loaded with its opening C3 directed downward from the topside of the main body 1. It is also possible to install the film winding apparatus of the foregoing embodiment in the same position as shown in FIG. 1. This can be done by modifying the automatic film developing machine in such a way that the film F fed by the rollers 11*h* is directed in a horizontal direction and the cartridge carrier 14 loads the cartridge C onto the cartridge mount 5 after turning the cartridge C 90 degrees clockwise from its initially gripped position.

The film winding apparatus incorporated in the automatic film developing machine of this embodiment may automatically read cartridge ID data and compare it with film ID data after each cartridge C has been loaded on the cartridge mount 5 even when the SET button 31 is not pressed, or the process of reading and comparing these ID data may even be omitted because operation of the machine itself ensures that each film F is rewound into its original cartridge C. The automatic film developing machine carries out subsequent film winding operation in the same way as described with reference to the film winding apparatus shown in FIG. 1.

What is claimed is:

1. A film winding apparatus adapted for winding a film onto a spool disposed within a cartridge, said film winding apparatus comprising:
    an apparatus housing;
    a film winder provided in said apparatus housing for turning the spool housed in the cartridge to wind the film around the spool;
    a film inlet located on one side of said apparatus housing;
    a film feeder for feeding film inserted into said film inlet toward said film winder;
    a cartridge mount having a cartridge loading position disposed outside of said apparatus housing on another side of said apparatus housing such that the cartridge can be loaded on and unloaded from said cartridge mount from outside of said apparatus housing; and
    a transporter for conveying said cartridge mount along a linear path from the cartridge loading position to a film loading position inside of said housing next to said film winder where the film winder winds the film on the spool in the cartridge loaded on said cartridge mount in the film loading position, said transporter conveying said cartridge mount from said film loading position back to said cartridge loading position after the film has been wound on the spool in the cartridge.

2. A film winding apparatus as recited in claim 1 wherein said transporter includes
    an upright wall having a support pin for supporting the cartridge on one side of the cartridge, said support pin having a longitudinal length, said transporter and said upright wall being movable relative to said cartridge mount along the moving direction of said transporter a distance substantially equal to the length of said support pin, said transporter conveying said cartridge mount from the film loading position to the cartridge loading position, from where said transporter and said upright wall are further moved relative to said cartridge mount at least an amount equal to the length of said support pin.

3. A film winding apparatus as recited in claim 1, further comprising:
    a first reader for reading film identification data marked on the film while it is being fed;
    a second reader for reading cartridge identification data marked on the cartridge loaded on said cartridge mount when said cartridge mount is in said cartridge loading position outside said housing; and
    an indicator for displaying these identification data read by said first and second readers.

4. A film winding apparatus as recited in claim 3, further comprising:
    a comparator for judging whether the film identification data and cartridge identification data read by said first and second readers coincide with each other; and
    a loading inhibitor for inhibiting activation of said transporter in case of disagreement between the film identification data and cartridge identification data.

5. A film winding apparatus as recited in claim 4, further comprising:
    a forced loading control for entering a command to forcibly have the film winder wind the inserted film on the loaded cartridge; and
    a forced loading device for disabling said loading inhibitor and activating said transporter when said forced loading control is operated in case of disagreement between the film identification data and cartridge identification data read by said first and second readers.

6. A film winding apparatus as recited in claim 1 wherein the film has a cutout in its foremost end portion and the cartridge has an opening through which the film is inserted and pulled out, and wherein said film feeder includes:
    a film positioner for advancing the foremost end of the film up to a position in front of said opening of the cartridge and holding it there in a standby position, and
    a film inserter having a hooking member for hooking to the cutout in the film at said standby position and guiding the foremost end of the film through said opening of the cartridge up to the spool by moving said hooking member.

7. A film winding apparatus as recited in claim 6 wherein said film positioner has a foremost end bending member for bending the foremost end portion of the film at said standby position, and said hooking member being hooked to the cutout in the film when the foremost end portion of the film is bent by said foremost end bending member.

8. A film winding apparatus as recited in claim 7 wherein said foremost end bending member includes a guiding surface and a roller.

9. A film winding apparatus as recited in claim 6 wherein said film inserter is a rotating device which causes said hooking member to move along an arc-shaped path so that said hooking member hooks to the cutout in the film from one direction, passes through said opening of the cartridge, and goes into the spool.

10. A film winding apparatus as recited in claim 9 wherein said film inserter includes a radially shifting device for shifting said hooking member to the outside of said arc-shaped path at least from a point immediately before said hooking member hooks to the cutout in the film up to a point before the foremost end portion of the film guided through said opening of the cartridge is attached to the spool, and wherein said hooking member which has hooked to the cutout passes through said opening while returning to said arc-shaped path.

11. A film winding apparatus as recited in claim 10 wherein said radially shifting device comes into momentary contact with a portion of said rotating device while said hooking member is being moved for displacing the center of rotary motion of said rotating device.

12. A film winding apparatus as recited in claim 1 wherein said transporter includes:
    a loading mechanism capable of moving the cartridge mount between the cartridge loading position exposed to the outside of said apparatus housing and the film loading position inside said apparatus housing;

a motor for moving said loading mechanism; and a torque limiter provided between said motor and the film loading position.

13. A film winding apparatus as recited in claim 12, wherein said transporter further comprises:

a stopper which comes into contact with said loading mechanism for stopping the cartridge mount at the film loading position;

a stop position sensor for detecting the cartridge mount at the film loading position; and a motor deactivator for deactivating said motor based on an output signal from said stop position sensor.

14. A film winding apparatus as recited in claim 12 or 13 wherein said loading mechanism further comprises a pinion gear firmly mounted on a drive shaft of said motor, said loading mechanism including a rack which is engaged with said pinion gear, and said torque limiter being provided between said pinion gear and said rack.

15. A film winding apparatus as recited in claim 13 wherein the transport further comprises:

a cartridge loading position stopper which comes into contact with said loading mechanism for stopping the cartridge mount at the cartridge loading position exposed to the outside of said apparatus housing when said motor is driven in its reverse running direction;

wherein said stop position sensor also detects the cartridge at the cartridge loading position; and said motor deactivator also deactivates said motor based on an output signal produced by said stop position sensor when it detects the cartridge at the cartridge loading position.

16. A film winding apparatus as recited in claim 1 wherein the spool housed in the cartridge has an interlocking end featuring angular directionality, the film winding apparatus further comprising:

a locking device for restraining the spool from rotating;

a locking device controller for activating and deactivating said locking device;

a rotating shaft which is slidable in an axial direction and can mesh with the interlocking end of the spool only when the angular position of said rotating shaft matches that of the interlocking end of the spool;

a spring member for forcing said rotating shaft in an axial direction so that said rotating shaft can mesh with the interlocking end of the spool;

a sensor for sensing that said rotating shaft has meshed with the interlocking end of the spool;

a driver for supplying a rotating force to said rotating shaft; and a driver controller for causing said rotating shaft to rotate from an initial angular position until said sensor senses that said rotating shaft has meshed with the interlocking end of the spool while restraining the spool from rotating with said locking device in a case where said sensor senses that said rotating shaft is not in mesh with the interlocking end of the spool.

17. A film winding apparatus as recited in claim 16 further comprising a rotating angle sensor for sensing an angle of rotation of said rotating shaft when it is rotated by said driver controller.

18. A film winding apparatus as recited in claim 17 wherein said rotating angle sensor senses an angle of rotation of said rotating shaft between specified angular positions.

19. A film winding apparatus as recited in claim 18 further comprising an angle indicator for displaying the angle of rotation sensed by said rotating angle sensor.

20. A film winding apparatus as recited in claim 1 wherein said apparatus housing comprises a main body and a cover capable of covering and uncovering at least part of a top surface of said main body, and wherein said film feeder includes a lower feeding section provided on the top of said main body and an upper feeding section provided on the bottom of said cover.

21. A film winding apparatus as recited in claim 20 further comprising a film detector provided near said film inlet for detecting the film inserted between said upper and lower feeding sections of said film feeder, wherein said film feeder is activated when said film detector detects the film.

22. A film winding apparatus according to claim 1 further comprising an image sensor for reading identifying data marked on the cartridge loaded on said cartridge mount when said cartridge mount is in said cartridge loading position outside of said housing.

23. A film winding apparatus according to claim 22 wherein said image sensor utilizes infrared light.

24. A film winding apparatus according to claim 22 wherein said cartridge mount includes a partial cylindrical member which receives said cartridge, said partial cylindrical member having an opening which exposes said identifying data marked on the cartridge to enable said image sensor to read said identifying data through said opening.

25. A film winding apparatus adapted for winding a film onto a spool disposed within a cartridge, the film winding apparatus comprising:

a housing;

a film winder provided on said housing for turning the spool disposed within the cartridge to wind the film around the spool;

a film feeder for feeding film toward said film winder;

a cartridge mount movable along a linear path between a cartridge loading position outside of said housing and a film loading position within said housing, said cartridge mount when in said cartridge loading position being disposed such that the cartridge can be loaded on and unloaded from said cartridge mount from the outside of said housing, said film winder being operable to wind the film onto the spool in said cartridge when the cartridge loaded on said cartridge mount is in said film loading position disposed within said housing; and a transporter for moving said cartridge mount back and forth along said linear path between said cartridge loading position and said film loading position.

26. A film winding apparatus according to claim 25 comprising a device for moving said transporter between first, second and third positions, said transporter when in said first position disposing said cartridge mount in said film loading position within said housing, said transporter when in said second position disposing said cartridge mount in said cartridge loading position outside of said housing, said transporter when in said third position being spaced from said second position, said cartridge mount being retained in said cartridge loading position when said transporter is moved from said second position to said third position.

27. A film winding apparatus according to claim 26 wherein said transporter moves along a linear path when moving between said first, second and third positions, said transporter including a cartridge support pin having a longitudinal axis parallel to said linear path, said support pin having a longitudinal length substantially equal to the distance between said second and third positions of said transporter.

28. A film winding apparatus according to claim 27 wherein said cartridge support pin engages said cartridge when said transporter is in said second position, said cartridge pin being disengaged from said cartridge when said transporter is in said third position.

29. A film winding apparatus according to claim 26 wherein said housing has an opening through which said cartridge mount passes when the cartridge mount moves between said cartridge loading position and said film loading position, said transporter having a wall which substantially blocks off said opening when said cartridge mount is in said film loading position.

30. A film winding apparatus according to claim 27 wherein said housing has an opening through which said cartridge mount passes when the cartridge mount moves between said cartridge loading position and said film loading position, said transporter having a wall which substantially blocks off said opening when said cartridge mount is in said film loading position, said cartridge support pin extending generally perpendicularly from said wall, said cartridge support pin engaging said cartridge when said transporter is in said second position, said cartridge pin being disengaged from said cartridge when said transporter is in said third position.

31. A film winding apparatus according to claim 25 wherein said film has a cutout in its leading end portion and the cartridge has an opening through which the film is inserted into the cartridge, said film winding apparatus further comprising a film inserter having a hooking member for hooking onto said cutout in said leading end portion of said film and inserting the leading end portion of the film through said opening in the cartridge up to the spool within the cartridge, a rotatable support having a rotatable axis, said rotatable support supporting said hooking member for movement about said rotatable axis, and shifting means for shifting said rotatable support and said rotatable axis between a home position and shifted positions, said shifting means shifting said rotatable support and said radial axis from said home position to said shifted positions to facilitate hooking of said hooking member onto said cutout on said end portion of said film.

32. A film winding apparatus adapted for winding a film onto a spool disposed within a cartridge and wherein the film has a cutout in a leading end portion and the cartridge has an opening through which the film is inserted into the cartridge, said film winding apparatus comprising:

a housing;

a cartridge mount on said housing;

a film winder provided on said housing for turning the spool disposed within the cartridge to wind the film around the spool;

a film feeder for feeding film toward said film winder; and a film inserter having a hooking member for hooking onto said cutout in said leading end portion of said film and inserting the leading end portion of the film through said opening in the cartridge up to the spool within the cartridge, a rotatable support having a rotatable axis, said rotatable support supporting said hooking member for movement about said rotatable axis, and shifting means for shifting said rotatable support and said rotatable axis between a home position and shifted positions, said shifting means shifting said rotatable support and said radial axis from said home position to said shifted positions to facilitate hooking of said hooking member onto said cutout on said end portion of said film.

33. A film winding apparatus according to claim 32 wherein said hooking member has a first and a third path of travel, said first and third paths of travel each being circular paths having a center at said rotatable axis of said rotatable support and each having the same radius of curvature, said hooking member having a second path of travel between said first and second paths of travel, said second path of travel being disposed radially outwardly of said first and third paths of travel.

34. A film winding apparatus according to claim 33 wherein said axial support and said rotatable axis are in said home position when said hooking member traverses said first and third paths of travel, said rotatable support and said rotatable axis being in said shifted positions when said hooking member traverses said second path of travel.

35. A film winding apparatus according to claim 34 wherein said film inserter comprises a swinging member pivotal about a pivot support on the swinging member, said hooking member having an extended arm, an elongated slot in said extended arm, said elongated slot having a first end and a second end, said pivot support being disposed in said elongated slot, biasing means biasing said extended arm to a first position where said first end of said slot is disposed against said pivot support, said first position corresponding to said home position of said hooking member, a cam device on said extended arm and said swing arm engageable to overcome the bias of said biasing means and to displace said extended arm relative to said swinging member and thereby displace said slot from said first position to displaced positions where said first end of said slot is spaced from said pivot support.

36. A film winding apparatus according to claim 35 wherein said cam device comprises a cam surface on said extended member and a cam member on said swing arm, said cam member engaging said cam surface to effect said displacement of said slot from said first position to said displaced positions when said hook member traverses said second path of travel.

37. A film winding apparatus according to claim 35 wherein said film inserter comprises a crank device operatively connected to said swinging member for alternately swinging said swinging member clockwise and counterclockwise.

38. A film winding apparatus according to claim 37 wherein said film feeder includes a drive roller for advancing said film such that the leading end portion of the film is disposed in a standby position, a drive motor, and operable means alternately connecting said drive motor to said crank device and to said drive roller such that said drive motor is operable to separately drive said crank device and said drive roller.

39. A film winding apparatus according to claim 32 wherein said film feeder comprises a first guide having a downstream end portion juxtaposed to said cartridge mount, said downstream end portion having a generally concave section, said film feeder having a second guide disposed in superimposed relationship with said first guide, said second guide having a downstream end portion juxtaposed to said cartridge mount, a swing plate pivotably mounted on said downstream end portion of said second guide, rollers on said swing plate, and biasing means biasing said swing plate to bias said rollers towards said concave section of said first guide, said film feeder advancing said film to a standby position in which said leading end portion of said film is disposed between said concave section and said rollers to effect bending of said leading end portion of said film and thereby facilitating hooking of said cutout in said leading end portion of said film by said hooking member.

40. A film winding apparatus adapted for winding a film onto a spool disposed within a cartridge and wherein the film has a cutout in a leading end portion and the cartridge has an opening through which the film is inserted into the cartridge, said film winding apparatus comprising:

a housing;

a cartridge mount on said housing;

a film winder provided on said housing for turning the spool disposed within the cartridge to wind the film around the spool;

a film feeder for feeding film toward said film winder; and a film inserter having a hooking member for hooking onto said cutout in said leading end portion of said film and inserting the leading end portion of the film through said opening in the cartridge up to the spool within the cartridge;

said film feeder comprising a first guide having a downstream end portion juxtaposed to said cartridge mount, said downstream end portion having a generally concave section, said film feeder having a second guide disposed in superimposed relationship with said first guide, said second guide having a downstream end portion juxtaposed to said cartridge mount, a swing plate pivotably mounted on said downstream end portion of said second guide, rollers on said swing plate, and biasing means biasing said swing plate to bias said rollers towards said concave section of said first guide, said film feeder advancing said film to a standby position in which said leading end portion of said film is disposed between said concave section and said rollers to effect bending of said leading end portion of said film and thereby facilitating hooking of said cutout in said leading end portion of said film by said hooking member.

\* \* \* \* \*